(12) United States Patent
Tomkow et al.

(10) Patent No.: US 7,886,008 B2
(45) Date of Patent: Feb. 8, 2011

(54) SYSTEM AND METHOD FOR VERIFYING DELIVERY AND INTEGRITY OF ELECTRONIC MESSAGES

(75) Inventors: Terrence A. Tomkow, Los Angeles, CA (US); Zafar D. Khan, Manhattan Beach, CA (US)

(73) Assignee: Rpost International Limited (BM)

(*) Notice: Subject to any disclaimer, the term of this patent is extended or adjusted under 35 U.S.C. 154(b) by 549 days.

(21) Appl. No.: 10/094,112

(22) Filed: Mar. 8, 2002

(65) Prior Publication Data

US 2003/0172120 A1 Sep. 11, 2003
US 2006/0112165 A9 May 25, 2006

Related U.S. Application Data

(63) Continuation-in-part of application No. 09/626,577, filed on Jul. 27, 2000, and a continuation-in-part of application No. 09/991,201, filed on Feb. 22, 2002, now Pat. No. 7,240,199.

(60) Provisional application No. 60/146,074, filed on Jul. 28, 1999, provisional application No. 60/172,479, filed on Dec. 17, 1999, provisional application No. 60/275,363, filed on Mar. 12, 2001, provisional application No. 60/262,887, filed on Jan. 23, 2001, provisional application No. 60/254,422, filed on Dec. 6, 2000.

(51) Int. Cl.
*G06F 15/16* (2006.01)
*G06F 12/00* (2006.01)

(52) U.S. Cl. .................... 709/206; 709/207

(58) Field of Classification Search ............ 705/53, 705/78–79; 709/206–207, 225–229, 250; 434/354; 235/375
See application file for complete search history.

(56) References Cited

U.S. PATENT DOCUMENTS 5,239,165 A * 8/1993 Novak ................ 235/375

(Continued)

FOREIGN PATENT DOCUMENTS

WO 96/38987 A 12/1995

(Continued)

OTHER PUBLICATIONS

Cervenni et al, "A Multiprovider, Universal, E-mail Service for the Secure Exchange of Legally-Binding Multimedia Documents" Eurocomm 2000 Information Systems for Enhanced Public Safety and Security, IEEE/AFCEA, May 17, 2000, pp. 47-50.

(Continued)

*Primary Examiner*—Zarni Maung
(74) *Attorney, Agent, or Firm*—John K. Fitzgerald; Fulwider Patton LLP

(57) ABSTRACT

A first party (e.g. educational testing service) provides through the internet to a control server information (e.g. test server) relating to a second party (e.g. a student taking tests prepared by the service). The server provides and may store a verification (e.g. an encrypted digital signature) but does not store, the second party information. The server transmits the information and the verification through the internet to the second party. The second party transmits to the server through the internet the information and the verification with a request to transmit the information to a designated third party (e.g. a college or university to which the student has applied for admission). The server authenticates the information through verification comparisons (or through comparison of the information with the reconstruction and decryption of the verification) and transmits the information, authenticated by the server and the testing service, to the third party.

29 Claims, 22 Drawing Sheets

U.S. PATENT DOCUMENTS

| | | | |
|---|---|---|---|
| 5,553,145 A | | 9/1996 | Micali |
| 5,709,603 A | * | 1/1998 | Kaye .......................... 463/17 |
| 5,768,382 A | * | 6/1998 | Schneier et al. ............. 380/251 |
| 5,915,973 A | * | 6/1999 | Hoehn-Saric et al. ....... 434/350 |
| 5,916,024 A | * | 6/1999 | Von Kohorn ................ 463/40 |
| 5,947,747 A | * | 9/1999 | Walker et al. ................ 434/354 |
| 5,970,143 A | * | 10/1999 | Schneier et al. ............. 713/181 |
| 6,024,641 A | * | 2/2000 | Sarno .......................... 463/17 |
| 6,149,440 A | * | 11/2000 | Clark et al. ................. 434/322 |
| 6,203,427 B1 | * | 3/2001 | Walker et al. ................ 463/16 |
| 6,327,656 B2 | * | 12/2001 | Zabetian ..................... 713/176 |
| 6,356,935 B1 | * | 3/2002 | Gibbs ......................... 709/206 |
| 6,418,298 B1 | * | 7/2002 | Sonnenfeld ................ 434/350 |
| 6,460,042 B1 | * | 10/2002 | Hitchcock et al. ............. 707/10 |
| 6,681,098 B2 | * | 1/2004 | Pfenninger et al. .......... 434/362 |
| 6,913,534 B2 | * | 7/2005 | DeFrees-Parrott et al. .... 463/17 |
| 7,395,241 B1 | * | 7/2008 | Cook et al. .................. 705/39 |
| 2002/0028430 A1 | * | 3/2002 | Driscoll et al. .............. 434/322 |
| 2002/0091782 A1 | * | 7/2002 | Benninghoff, III .......... 709/206 |
| 2002/0174123 A1 | * | 11/2002 | Harbaugh ................... 707/100 |
| 2003/0023547 A1 | * | 1/2003 | France et al. ................. 705/39 |
| 2004/0166942 A1 | * | 8/2004 | Muir ........................... 463/43 |

FOREIGN PATENT DOCUMENTS

| | | |
|---|---|---|
| WO | 98/17042 A2 | 4/1998 |
| WO | 99/08424 A | 2/1999 |
| WO | 01/10090 A | 2/2001 |

OTHER PUBLICATIONS

European Search Report, Feb. 5, 2008, pp. 1-7.
State Intellectual Property Bureau of PRC, "Notification of First Office Action," Oct. 12, 2007, p. 1-2.
Giorgio Cevenini et al., "A Multiprovider, Universal, E-Mail Service for the Secure Exchange of Legally-Binding Multimedia Documents," May 2000, p. 47-50.

* cited by examiner

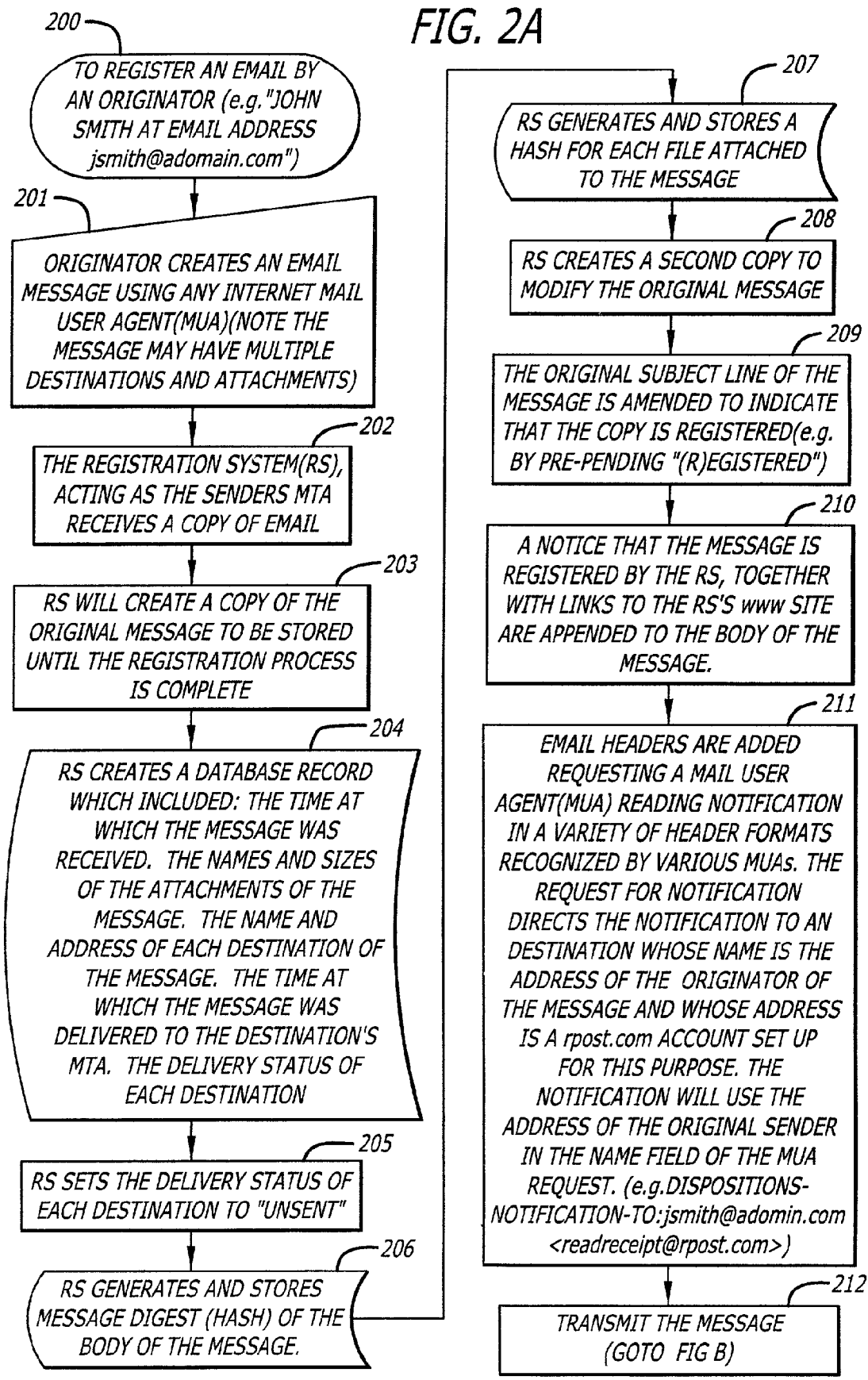

SYSTEM AND METHOD FOR VERIFYING DELIVERY AND INTEGRITY OF ELECTRONIC MESSAGES

This application is a continuation-in-part of U.S. application Ser. No. 09/626,577, filed Jul. 27, 2000, which claims the benefit of priority from U.S. Provisional Application Nos. 60/146,074, filed Jul. 28, 1999 and 60/172,479, filed Dec. 17, 1999 and is also a continuation-in-part of U.S. application Ser. No. 09/991/201, now U.S. Pat. No. 7,240,199, filed on Feb. 22, 2002, which claims the benefit of priority from U.S. Provisional Application Nos. 60/275,363, filed Mar. 12, 2001, 60/262,887, filed Jan. 23, 2001 and 60/254,422, filed Dec. 6, 2000; each application and provisional application cited above incorporated herein in their entirety.

This invention relates to a method of providing information from a first party relating to a second party and for transmitting this information on a secure basis to a third party. In this way, the third party can be assured that the information relating to the second party is proper.

BACKGROUND OF A PREFERRED EMBODIMENT OF THE INVENTION

Each year, students interested in advancing their education take examinations to indicate their educational achievements. The tests are given by testing services. For examples, high school seniors interested in attending colleges take examinations to indicate their proficiencies in various subjects such as English and mathematics. They also take tests relating to general intelligence. The test results are provided to the students. They are then conveyed to the colleges and universities to which the students have applied for admittance. In April, the students receive indications from the colleges and universities as to whether they have been admitted to these colleges and universities. The testing systems now in use are cumbersome. Furthermore, they are not secure. In other words, it is possible for the students to alter their test scores before the test scores are submitted to the colleges and universities to which they have applied for admission.

I. Description of the Related Art

In recent years e-mail has become an indispensable business tool. E-mail has replaced "snail mail" for many business practices because it is faster, cheaper and generally more reliable. But there remain some mail applications where hard copy is still dominant, such as registered and certified mail. For example, when a letter is sent by certified mail the sender is provided with a receipt to prove that the letter was mailed. A returned registered mail receipt adds the Postal Service's confirmation that the letter was successfully delivered to the addressee or the addressee's authorized agent. Additionally, private couriers such as Federal Express® and United Parcel Service® (UPS) provide some type of delivery confirmation. Since every piece of courier mail is, in effect, registered, it is natural for consumers to turn to these services when they want proof of delivery.

Many existing e-mail systems and e-mail programs already provide for some form of proof of delivery. For instance, some e-mail systems today allow a sender to mark a message wit1h "request for notifications" tags. Such tags allow a sender to request notification that the message was delivered and/or when the message was opened. When a sender requests delivery notification, the internet e-mail system may provide the sender with an e-mail receipt that the message was delivered to the mail server or electronic in-box of the recipient. The receipt message may include the title of the message, the destination address, and the time of delivery. It may also include (depending on the types of "flags" that are provided and activated in the mailing software) a list of all the internet "stations" that the message passed through en route to its destination. This form of reporting is built into some of the rules and protocols which implement e-mail. Furthermore, when a message is sent with a "read notification" request, the recipient's e-mail program may send to the sender an e-mail notification that the recipient opened that message for reading. Many electronic mail clients can and do support this kind of reporting; however, internet protocols do not make this mandatory.

However, this does not mean that an e-mail sent with a notification request is as effective in all respects as registered mail. People certify and register letters because they want proof of delivery, e.g., proof that can be used in a civil or criminal proceeding, or proof that will satisfy a supervisor or a client or a government agency that a message has been sent, a job has been done, an order placed, or a contract requirement satisfied.

A registration receipt from the United States Postal Service (USPS) constitutes proof of delivery because the USPS stands behind it. The receipt represents the Post Office's confirmation that the letter or package in question was actually delivered to the addressee or his authorized representative. On the other hand, various hurdles exist to an e-mail receipt being admitted and relied upon as persuasive evidence in a court of law as a proof that the message was delivered. After all, the receipt may be just another e-mail message that could have been altered or created by anyone, at any time.

There exists a need for an e-mail system and/or method that can provide reliable proof of the content and delivery of an e-mail message in order to take fuller advantage of the convenience and low cost of communicating via e-mail.

To meet this need some systems have been established whereby senders may receive third party proof of delivery by enrolling in services whereby:

a) The sender transmits an electronic message to a third party together with a list of the document's intended recipients.

b) The third party sends a notification to each of the message's intended recipients inviting them to visit the third party's web site where the message can be viewed.

c) If the intended recipient visits the third party's web site to view the message, the third party records this visit so that the sender may know that his message has been read by the recipient.

The drawbacks of such systems are manifold. In the first place, they rely essentially on the co-operation of the recipient of the e-mail to collect his messages from the third party's service. But the circumstances in which a sender may want proof of delivery of a message are often ones in which it cannot be assumed that the intended recipient will co-operate in receiving the message. In such cases, e.g. where acknowledging receipt of the message would place a financial or legal burden on the recipient, the recipient can simply ignore the notification that mail is available for him to receive. Note that there is nothing in such a system to guarantee that the intended recipient has received notification of waiting mail. In the second place, such systems are cumbersome and slow to use as compared to regular e-mail insofar as it can require the sender and/or the recipient to connect to a World Wide Web site to send, collect and verify the delivery of each message. Moreover, transmission of documents by such methods may require both sender and receiver to upload and download files to a web site. Finally, because these methods require the third party to retain a copy of the whole of each message until such time as they are collected or expired, the methods can require its provider to devote substantial computational resources to data storage and data tracking over an extended period of time. As an alternative method of providing proof of delivery, some systems provide proprietary e-mail clients or web-browser plug-ins that will notify senders when a message has been received provided that a recipient uses the same e-mail client. The obvious disadvantage of such systems is that they require both sender and recipient to use the same e-mail client.

Therefore, there exists a need for an e-mail system/method that can provide reliable proof of the content and delivery of electronic messages which does not require the compliance or co-operation of the recipient, which requires no special e-mail software on the part of sender or recipient, which operates with the same or nearly the same convenience and speed of use as conventional e-mail, and which can be operated economically by a service provider.

A general object of the invention disclosed and claimed in co-pending non-provisional application Ser. No. 09/626,577, filed by Terrance A. Tomkow on Jul. 27, 2000 and assigned of record to the assignee of record in this application is to provide a system and method for reliably verifying via secure and tamper-proof documentation the content and delivery of an electronic message such as an e-mail. Ideally, the invention disclosed and claimed in co-pending application Ser. No. 09/626,577 will give e-mail and other electronic messages a legal status on a par with, if not superior to, that of registered United States mail. However, it is not necessary to the invention that any particular legal status is accorded to messages sent according to the methods taught herein, as the invention provides useful information and verification regardless.

The invention disclosed and claimed in co-pending non-provisional application Ser. No. 09/626,577 includes an electronic message system that creates and records a digital signature of each electronic message sent through the system. An originator may send a copy of the electronic message to the system or generate the electronic message within the system itself. The system then forwards and delivers the electronic message to all recipients (or to the designated message handlers associated with the recipients), including "to" addressees and "cc" addressees. Thereafter, the system returns a receipt of delivery to the originator of the electronic message. The receipt includes, among other things: the original message, the digital signature of the message, and a handshaking and delivery history including times of delivery to the recipients. To later verify and authenticate information contained in the receipt, the originator or user sends a copy of the receipt to the system. The system then verifies that the digital signature matches the original message and the rest of the receipt. If the two match, then the system sends a letter or provides other confirmation of authenticity verifying that the electronic message has not been altered.

The system disclosed and claimed in co-pending non-provisional application Ser. No. 09/626,577 may include a form of e-mail server connected to the internet, which can be utilized in many ways. For instance, individual users can register their electronic messages, such as e-mails, by sending a "carbon copy" (cc:) to the system or composing the message within the system itself. For corporate or e-commerce users, these users can change their server to a server incorporating the present invention and have all of their external electronic messages registered, with the option of having the system retain and archive the receipts. The system can accept and verify encrypted electronic messages and manage the electronic messages within and/or outside a "fire wall." For web-based users, i.e., individuals or corporations using web-based e-mails, such as MSN Hotmail® or Yahoo Mail®, such users could check a box or otherwise set a flag within their e-mail programs to select on a case-by-case basis whether to make the e-mails of record and/or to archive the messages using the system disclosed and claimed in co-pending non-provisional application Ser. No. 09/629,577.

The digital signature can be created using known digital signature techniques, such as by performing a hash function on the message to produce a message digest and then encrypting the message digest. Separate digital signatures can be created for the body of the message, any attachments, and for the overall message including the body, the attachments, and the individual message digests. The encrypted message digest provides one type of message authentication or validation code, or secure documentation. Other message authentication and/or validation codes may also be generated and used.

In one aspect, the invention disclosed and claimed in co-pending application Ser. No. 09/626,577 is a method of providing proof regarding the delivery and content of an electronic message, comprising: receiving from a sender across a computer network an electronic message, the message having a delivery address associated therewith; computing a message digest according to the message; encrypting the message digest; sending the message electronically to a destination corresponding to the delivery address; recording the Simple Mail Transport Protocol (SMTP) or Extended SMTP (ES-MTP) dialog which effects the delivery of the message; receiving Delivery Status Notification information associated with the message and the delivery address; providing to the sender an electronic receipt, the receipt comprising: a copy of the message, the encrypted message digest, the (E)SMTP transcripts, and at least a subset of the Delivery Status notification information, and, at a future date, receiving electronically the electronic receipt from the sender, verifying that the encrypted message digest corresponds to the message, and verifying that the message was received by an electronic message handler associated with the delivery address.

In another aspect, the invention disclosed and claimed in co-pending application Ser. No. 09/626,577 includes a method of verifying delivery of an electronic message, comprising: in a wide area network computer system, receiving an electronic message from a message sender for routing to a destination address; establishing communication with an electronic message server associated with the destination address, the server defining a destination server; querying the destination server to determine whether the destination server supports Delivery Status Notification (DSN) functionality; receiving a response to the query, the query and response together defining an SMTP dialog; requesting Delivery Status notification information from the destination server according to results of the SMTP dialog; transmitting the electronic message to the destination address; receiving DSN information from the destination server with respect to delivery of the electronic message; and providing to the message sender at least a portion of the SMTP dialog, and at least a portion of the DSN information.

In yet another aspect, the invention disclosed and claimed in co-pending application Ser. No. 09/626,577 includes a method of verifying content of a received electronic message, comprising: receiving the electronic message; generating a digital signature corresponding to the content of the received message; providing the message and the digital signature to a designated addressee; and, at a later time, verifying that the digital signature corresponds to the message.

In accordance with still another aspect of the invention disclosed and claimed in co-pending application Ser. No.

09/626,577, the method includes establishing whether a message was electronically received by a recipient, comprising: providing a message to be dispatched electronically along with a recipient's address from a sender; creating a signature associated with the message; dispatching the message electronically to the recipient's address; tracking the message to determine a final Delivery Status of the message dispatched to the recipient's address; upon receiving final Delivery Status of the message, generating a receipt, the receipt including a copy of the message, the signature, and the final Delivery Status for the message; and providing the receipt to the sender for later establishing that the message was electronically received by the recipient.

In accordance with yet another aspect of the invention disclosed and claimed in co-pending application Ser. No. 09/626,577, a method is provided for proving that an electronic message sent to a recipient was read, comprising: providing an electronic message along with a recipient's address; calculating a digital signature corresponding to the electronic message; dispatching the electronic message electronically to the recipient's address; requesting a Mail User Agent (email client "reading") notification from the recipient; upon receiving the reading notification, generating a reading receipt, the reading receipt including a copy of the message, the digital signature for the corresponding electronic message, and a second digital signature for the reading receipt from the recipient; and providing the reading receipt for later verification that said message was received by the recipient.

In accordance with another aspect of the invention disclosed and claimed in co-pending application Ser. No. 09/626,577, a method is provided for validating the integrity of a purported copy of an electronic message, comprising: receiving the purported electronic message copy, said purported copy including an encrypted message digest associated therewith; decrypting the message digest; generating a second message digest based on content of the purported copy; and validating the purported copy by comparing the decrypted message digest and the second message digest to determine whether the two message digests match.

In accordance with a still further aspect of the invention disclosed and claimed in co-pending application Ser. No. 09/626,577, a method is provided for validating a received registered e-mail, comprising: receiving an electronic receipt, said receipt including a base message and an encrypted message digest; decrypting the encrypted message digest; generating a second message digest from the base message; and validating the e-mail if the decrypted message digest matches the second message digest.

In yet another aspect, the invention disclosed and claimed in co-pending application Ser. No. 09/626,577 includes a website at which users can go to send and receive secure messages, with the website host acting as an independent third party which will send and receive the messages and provide secure documentation regarding the content and delivery of the messages.

In co-pending application Ser. No. 09/991,201 filed by applicant on February 2002 for SYSTEM AND METHOD FOR VERIFYING DELIVERY AND INTEGRITY OF ELECTRONIC MESSAGES and assigned of record to the assignee of record to the assignee of record of this application, a server receives a message from a sender and transmits the message through the internet to a recipient. The server normally transmits the message in a first path through the internet to the recipient. When the sender indicates at a particular position in the message that the message is registered, the server transmits the message in a second path through the internet to the recipient. The sender can also provide additional indications in the message to have the server handle the message in other special ways not normally provided by the server.

After learning from the receipt or the recipient's agent through the internet that the message has been successfully received, the server creates, and forwards to the sender, an electronic receipt. In co-pending application Ser. No. 09/991, 201, the receipt includes at least one, and preferably all: the message and any attachments, a delivery success/failure table listing the receipts, and the receipt times, of the message by the recipient's specific agents, and the failure of other agents of the recipient to receive the message and a digital signature of the message and attachments subsequently. By verifying that the digital signature on the sender's receipt matches the digital receipt at the server, the server can verify, without retaining the message, that the receipt is genuine and that the message is accurate.

BRIEF DESCRIPTION OF PREFERRED EMBODIMENTS OF THE INVENTION

A first party provides through the internet to a control server information relating to a second party. The first party may be an educational testing service. The second party may be a student taking tests prepared by the service. The information may be test scores of the student. The server provides and stores a verification (e.g. encrypted digital signature) of, but does not store, the information relating to the second party.

The server transmits the information and the verification through the internet to the second party. The second party then transmits to the server through the internet the verification and the information with a request to transmit the information to a designated third party. The third party may be a college to which the student has applied for admission.

The server authenticates the information through verification comparisons (or through comparison of the information with the reconstruction and decryption of the verification) and transmits the information, authenticated by the server and the testing services, to the third party.

BRIEF DESCRIPTION OF THE DRAWINGS

A detailed description of the preferred embodiment of the invention will be made with reference to the accompanying drawings.

DETAILED DESCRIPTION OF PREFERRED EMBODIMENTS OF THE INVENTION

This description is not to be taken in a limiting sense, but is made merely for the purpose of illustrating the general principles of the invention. The section titles and overall organization of the present detailed description are for the purpose of convenience only and are not intended to limit the present invention. Accordingly, the invention will be described with respect to e-mail messaging systems that use the internet network architecture and infrastructure. It is to be understood that the particular message type and network architecture described herein is for illustration only; the invention also applies to other electronic message protocols and message types using other computer network architectures, including wired and wireless networks. For convenience of discussion, messages that are processed according to the invention disclosed and claimed in co-pending application Ser. No. 09/626,577 may be referred to herein as being "made of record" messages. In the discussion which follows, the term "RPost" will refer in general terms to a third party entity which creates and/or operates software and/or hardware implementing the present invention, and/or acts as a disinterested third party message verifier. Messages that are processed according to the present inventions are referred to as "registered" messages. The term is used for convenience of exemplary discussion only, and is not to be understood as limiting the invention.

Rpost as Outgoing Mail Server Embodiment

Figure 1:
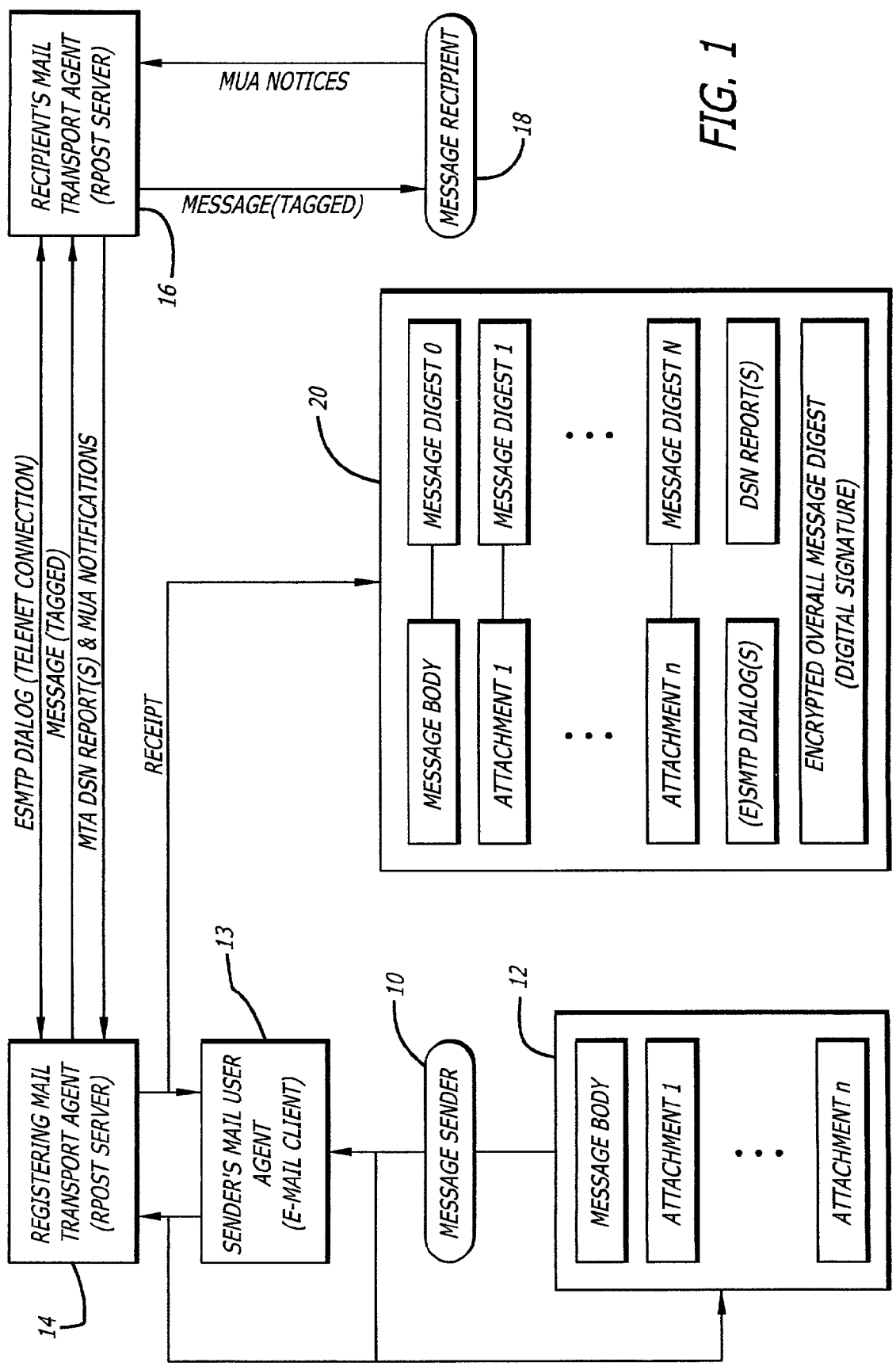
FIG. 1 is a system diagram of a first embodiment of an invention disclosed and claimed in co-pending application Ser. No. 09/626,577, in which embodiment outgoing messages are made of record by being transmitted by a special Mail Transport Agent (MTA).

FIG. 1 is a system diagram of a first embodiment of the present invention, wherein outgoing e-mails are made of record according to the invention disclosed and claimed in co-pending non-provisional application Ser. No. 09/626,577. In this embodiment, the RPost server 14 serves as the primary outgoing Mail Transport Agent (MTA) for a message sender's Mail User Agent (MUA) 13. Although message recipient 18 is technically the addressee and is therefore merely the intended recipient or intended destination at this point in time, for simplicity of discussion this entity will be referred to herein as the recipient, addressee, or destination. Note that a single message may have many different destinations and that each of these may be reached through a different MTA. The method of sending messages made of record may divided into three parts:

1) Preprocessing: Steps to be taken before a message is transmitted;
2) Transmission: The method of delivering messages to addressees;
3) Post Processing: Procedures for gathering information about messages after their delivery, the creation of receipts, and the validation of receipts.

1.1 Preprocessing

On receiving a message for transmission, the Rpost server 14 will create records in a database for each message that will be used to store such information as:

a) the time at which the message was received;
b) the names of the attachments of the message; and
c) the number of addresses of the message.

For each destination of the message the database will record:

a) the name of the destination (if available);
b) the internet address of the destination;
c) the time at which the message was delivered to the destination's Mail Server; and
d) the Delivery Status of this destination.

Recipient Delivery Statuses used by the system will include:
UNSENT
This status indicates that the message has not been sent.
DELIVERED-AND-WAITING-FOR-DSN
This status indicates that the message has been delivered to an ESMTP compliant MTA that supports Delivery Status Notification (DSN) so that a success/failure notification can be expected.
DELIVERED
This status signifies that the copy of the message sent to this recipient has been successfully delivered to a server that does not support ESMTP DSN.
DELIVERED-TO-MAILBOX
This status signifies that a DSN message has been received which indicates that the copy of the message sent to this recipient was delivered to the mailbox of the recipient.

RELAYED
  This status signifies that an MTA DSN has been received which indicates that the copy of the message sent to this recipient has been relayed onward to another server.
UNDELIVERABLE
  This status indicates that after repeated attempts RPost has been unable to connect to an MTA to deliver the messages to this recipient.
FAILED
  This status signifies that an MTA DSN has been received that indicates a failure to deliver a copy of the message to this recipient.

At this time the system will also perform hashing functions on the message's contents.

RPost server 14 employs a hash function and an encryption algorithm. The hash function may be one of any well-known hash functions, including MD2, MD5, the Secure Hashing Algorithm (SHA), or other hash functions which may be developed in the future. Hash algorithms and methods are described in Bruce Schneider, *Applied Cryptography: Protocols, Algorithms, and Source Code in C*, John Wiley & Sons, Inc. (New York) 1993; *Federal Information Processing Standard Publication* 180-1 (*FIPS PUB* 180-1) *Secure Hash Standard*, National Institute of Standards and Technology; and U.S. Pat. No. 5,530,757 issued to Krawczyk, entitled "Distributed Fingerprints for Information Integrity Verification," which are hereby incorporated by reference for their teachings of hash functions, encryption, and methods and systems for implementing those functions. Other known or new methods of detecting whether the contents of the message have been altered may be used.

A good hash function H is one-way; that is, it is hard to invert where "hard to invert" means that given a hash value h, it is computationally infeasible to find some input x such that $H(x)=h$. Furthermore, the hash function should be at least weakly collision-free, which means that, given a message x, it is computationally infeasible to find some input y such that $H(x)=H(y)$. The consequence of this is that a would-be forger who knows the algorithm used and the resulting hash value or message digest will nevertheless not be able to create a counterfeit message that will hash to the same number. The hash value h returned by a hash function is generally referred to as a message digest. The message digest is sometimes referred to as a "digital fingerprint" of the message x. Currently, it is recommended that one-way hash functions produce outputs that are at least 128 bits long in order to ensure that the results are secure and not forgeable. As the current state of the art advances, the recommended length for secure hash functions may increase.

RPost server 14 computes a message digest for the message body, and a separate message digest for each of the attachments of the message and stores these in a manner in which they may be later included in a receipt for the message.

Before the message is altered in the ways that registration will require, a copy of the original message and its attachments are stored in a manner in which they can be later retrieved by the system.

The RPost server 14 may alter a message in several ways before transmission to the recipient's MTA.

Although such is not necessary to the practice of the invention, the message may be tagged to denote the fact that the message has been made of record, such as by inserting the words "Made of Record" or at the beginning of the "subject" line of the message, by appending a tag such as, "This message has been made of record with RPost. Visit our web site at www.RPost.com for additional information."

at the end of the original message or other tagging. Additionally, the tag may contain instructions, World Wide Web addresses, or links that invite and allow the recipient to send a reply made of record to the message by linking to a Web Page from which messages made of record may be composed and sent.

Although tagging is optional, the delivered message will generally be referred to herein as the tagged message.

Internet protocols provide two forms of receipt for e-mail messages:

MTA NOTIFICATIONS

These are e-mails that are sent by a recipient's MTA notifying the nominal sender of the message that various events have occurred. MTAs that conform to the SMTP protocol will typically only send a notification in the event that the mailer cannot deliver a message to the mailbox of the addressee (as might happen if the address is not valid or if the addressee's mailbox has exceeded its allotted storage quota).

With the introduction of the Extended SMTP standard it became possible for sending MTAs to request notices of success and failure in the delivery of messages. These Delivery Status Notifications (DSNs) are e-mails which are sent by a receiving MTA to the nominal sender of the message when certain events occur: e.g. the message has been successfully deposited into the mailbox of the recipient; the message cannot be delivered to the recipient's mailbox for some reason; the recipient's message has been relayed on to another server which does not give DSN receipts.

Note that only e-mail servers that support the Extended SMTP (ESMTP) protocol support this form of DSN and that support for this function is optional for ESMTP servers and depends on the configuration selected by the server's administrators.

Although DSN is a term that only came into use with the advent of ESMTP, we will, in what follows, use 'DSN' to refer to any MTA generated message relating to the status of a received message whether or not it is in conformity to the ESMTP protocol.

MUA NOTICES (READING NOTIFICATIONS)

These are e-mails that are sent to the (nominal) author of a message by the recipient's Mail User Agent (MUA) (e-mail program) when certain events occur: e.g. the message is opened for reading, or deleted from the system without being read. By internet convention (RFC 1891), no MUA program can be forced to generate such notifications. Whether an MUA will generate these receipts will depend upon the configuration chosen by its user.

The RPost server 14 will configure and transmit messages in a way that attempts to elicit both MTA DSNs and MUA notices from compliant MTAs and MUAs. In order to elicit a Reading Receipt from compliant MUAs, certain headers should be included in the header section of an e-mail message. Different MUAs respond to different headers; hence Server 14 will add several different headers to each message requesting a read notification in a form recognized by various MUAs. These headers all take the form:

Header label: user name <user address>

For example:
Disposition-notification-to: john smith <jsmith@adomain.com>
read-notification-to: john smith <jsmith@adomain.com> where 'john smith' is the name of the user to whom an MUA notification is to be sent and '<jsmith@adomain.com>' is that user's internet address. Normally such headers would refer to the author of the message but in the case of the present method it is required that the notification be returned to RPost so that the notification can be processed by RPost. To assure that this is so Server 14 will insert headers that request that MUA receipts be sent to an address where they can be processed by the RPost server, for example: "readreceipt@RPost.com". This will direct any compliant recipient MUAs to send their notifications to an RPost address for processing.

The task of processing returned MUA notifications raises another problem that must be dealt with at this stage. There are no standards governing the format or content of MUA notifications. Often they will quote the subject of the original message and the time of the event (e.g. "opened for reading") that they are reporting. But even if this information is included in the notification it is rarely sufficient to uniquely identify the message that prompts it or to identify the author of that message. When the system receives a MUA notification it should be able to identify the message that prompts it, so as to include the notification information in the receipt that RPost will generate for the sender. Alternatively, the system should at least be able to reliably identify the sender of the message to which the MUA notification refers so that the notification information can be passed on to the sender in the form of an RPost Reading receipt (see below).

To accomplish the latter goal, the system can take advantage of the fact that internet addresses have two components: a name field and an address field, where the address field is set off by corner quotes "< >". Most MUAs will include both fields in the destination address of their MUA notifications. In composing its requests for MUA receipts, the RPost system will include the server 14 read receipt-handling address as the address for the notification but will use the address of the original sender in the name field of the header. For example, where the original sender of the message is user John Smith with internet address jsmith@adomain.com, the RPost server 14 will include headers of the form:

Disposition-notification-to: jsmith@adomain.com <readreceipts@RPost.com>

This will typically result in the compliant MUA sending a notification to readreceipts@RPost.com addressed as:
jsmith@adomain.com <readreceipts@RPost.com>

On receipt of such a notification at the address "readreceipts@RPost.com", the server can, by parsing the addressee's field, determine that the notification concerns a message originally sent by jsmith@adomain.com, even if this could not be determined by any examination of the contents of the notification. With this information in hand, the server can then package the contents of the notification in a digitally signed RPost Reading receipt and send the receipt to the address jsmith@adomain.com The RPost system will also endeavor to elicit and collect MTA DSN notices generated by recipient MTAs. Since such notifications are always sent to the address listed in the "FROM:" field of the message header, the server 14 will alter each message header so that the message is received as "FROM:" an RPost address at which DSNs may be processed.

However the problem of processing DSNs raises another issue, which will be dealt with at this stage. DSNs do not have any standard content or format; often it is impossible to determine, merely by examining the contents of these e-mails, what message their contents are giving notification of. This problem was supposed to have been addressed for DSNs generated in compliance with the ESMTP protocol by the use of DSN envelope ID numbers (see RFC 1869). According to the protocol, a transmitting MTA can include a reference number along with its request for a DSN. This number would be quoted in any returning DSN, allowing the sender to identify the subject message of the DSN. However, as a matter of fact, many MTAs that report themselves as supporting ESMTP DSN do not return a DSN envelope ID or any other information sufficient to reliably identify the subject message. Finally, even where a DSN does return information sufficient to identify the message it is giving notice of, it often will not contain sufficient information to identify the specific addressee of the message that has prompted the notification. Thus, a single message might be sent to two addressees at a domain; one might be successfully delivered to the addressee's mailbox; the other, not. The MTA for the domain may report these events in a DSN in ways that provide no way for the recipient of the DSN to determine which addressee was successfully delivered and which was not (as, for example, may happen if the DSN reports the recipient's addresses as their local alias names rather than by the addresses contained in the original message).

The present invention solves this problem in four steps:
1) A unique identification number is generated for each outgoing message (e.g. based upon a time stamp). This number is stored in a database.
2) The recipients of each message are enumerated and the identifying numbers are stored in a database.
3) The message is sent separately to each intended recipient's MTA. (Even when two recipients have a common domain name and MTA, the server 14 will transmit the message to that MTA in two separate SMTP telnet sessions.)
4) When the server 14 transmits the message to a recipient's MTA it augments the message's "FROM" field to show the message as having been sent from an address which incorporates the message's unique ID and the identifying number of the sender. The address also contains a substring (e.g. "rcpt") that enables the server to identify return messages as DSNs.

Thus, a single message denominated "mmyyddss" by the server 14, from the sender named John Smith, might be sent to its first intended recipient (denominated "a" by the system) with a header reading:
From: John Smith <rcptmmddyyssa@RPost.com>

The same message would be sent to the second recipient with a header reading:
From: John Smith <rcptmmddyyssb@RPost.com>

Many e-mail MUAs will only display the name of the sender of a message and thus the special address will be unseen by most recipients.

The upshot of this form of addressing is that when the recipient MTAs issue DSNs (whether ESMTP compliant or not) they will address those DSNs to different RPost addressees. On receiving these DSNs, the server 14 can identify them as DSN messages by their "RCPT" prefix and, by parsing the addressees, can determine which message and which recipient is the subject of the DSN.

The server 14 will alter the 'FROM' field of each message to refer to a recipient of the message each time it attempts to transmit the message to that recipient's MTA.

To insure that recipient replies to transmitted messages are directed properly the server 14 will add an explicit "reply-to:" message header into the message listing the original sender's name and internet address. In the case of the present example this would be:

Reply-to: john smith <jsmith@adomain.com>

This will lead recipient MUAs to address replies to a received message to the actual sender's address, rather than the constructed RPost address.

I.2 Transmission

As noted above, it is part of the method that the RPost server 14 transmits a separate copy of an outgoing message to each addressee of that message. Moreover RPost will attempt to make each such delivery through a direct SMTP connection with a mail eXchanger (MX) of record for each destination.

Note: Each valid internet e-mail address includes an internet domain name or IP address. Each domain name/address has associated with it an e-mail server(s) authorized to receive mail for addresses in that domain. It will be noted that some domains have more than one server. The Domain Name Server responsible for each domain broadcasts the identity of its mail servers across the internet. This information is publicly available and is managed and transmitted in ways that conform to rules and conventions which govern internet e-mail and Domain Name service.

Before transmitting a copy of a message to any destination the RPost server 14 will perform an internet Name Server Lookup to identify an MTA associated with the destination's domain. Having identified the MTA responsible for receiving mail on behalf of a destination address, the system will attempt to open a telnet connection with the destination's local MTA.

It is common practice for internet e-mails to be relayed from MTA to MTA until they reach their final destination. The primary purpose for providing a direct connection between the RPost server 14 and the destination's MTA is so that the RPost server can record delivery of the message, (this record taking the form of an SMTP dialogue) with the e-mail server which has proprietary responsibility for receiving e-mail for the recipient domain name.

The existence of this record provides helpful evidence that the message was delivered, in much the same way that a registered mail receipt provides evidence of delivery. USPS Registered mail is treated as verifiably delivered if it can be proved to have been delivered to the addressee's authorized agent (e.g. a secretary, or mail room clerk). In the event of any legal challenge to the evidentiary merit of an RPost delivery receipt, it will be recognized that in selecting an internet e-mail service provider, the recipient has authorized that provider to collect electronic messages on his behalf. In turn, that service provider has acknowledged its status as the authorized agent for e-mail recipients of that domain name by broadcasting the address of its MTAs as the receptive e-mail servers for this domain.

Accordingly, having delivered messages directly to the mail server responsible for receiving the recipient's e-mail, RPost will have delivered the message to an agent the recipient has legally authorized to receive his mail. By recording the delivery transaction (that transaction taking the form of an SMTP dialogue) RPost can claim to have proof of delivery to the recipient's authorized agent.

Note that while the method herein described attempts to collect other forms of proof of delivery to each destination, whether or not these attempts succeed will depend upon factors that will not be in the control of RPost, (e.g. the form of SMTP support deployed on the recipient's mail server). On the other hand, every successful delivery direct to a recipient's mail server will always generate an SMTP record. Recording this record allows RPost to provide proof of delivery to any valid internet destination that complies with the minimum protocols (SMTP) for internet mail. This represents an important advantage of the current method over other methods that might attempt to prove delivery by reliance on ESMTP DSN.

Having identified the MTA for a destination of a message, the RPost server 14 will attempt to open an ESMTP connection with the destination MTA by issuing an "EHLO" handshake in compliance with RFC 1869. If SERVER 16 supports ESMTP, it will respond by listing which ESMTP services it supports.

If SERVER 16 supports ESMTP, the RPost server 14 will first determine if SERVER 16 supports the ESMTP Service "VERIFY". The Verify service allows a calling SMTP server to determine, among other things, if an address in an MTA's domain is genuine. If the RPost server 14 determines by these means that the address it is attempting to deliver its message to is not valid, it will terminate the connection, cease attempting to deliver a message to this addressee, and record, in its database, the status of this message destination as UNDELIVERABLE.

Whatever its result, the RPost server 14 will record the ESMTP VERIFY dialogue in a file and store it so that it may be later attached to or included in the Delivery Receipt for this message. It should be noted that, out of concern for security, few ESMTP servers support the VERIFY function.

If System 16 does not support the VERIFY method, then the RPost server 14 will nevertheless attempt to deliver the message to System 16. Typically an MTA will accept messages for any address nominally in its domain and will later send a DSN if the address is invalid.

The RPost server 14 will then attempt to determine if the destination server supports the ESMTP service DSN. If it does, RPost will transmit the message with a request that SERVER 16 notify the sender of the message with an ESMTP DSN if the delivery to the addressee succeeds or fails. After the successful transmission of the message to this destination the system will record the Delivery Status of this destination as DELIVERED-WAITING-FOR-DSN.

If Server 16 replies to the "EHLO" handshake in a way that indicates that it does not support ESMTP, the RPost server 14 will issue a "HELO" message to initiate an SMTP connection. If this connection is achieved, the RPost server 14 will transmit the message in compliance with the SMTP protocol and will record the Delivery Status of the destination as DELIVERED.

Whether the connection is SMTP or ESMTP, the RPost server 14 will record the entire protocol dialogue between the two servers. Typically this dialogue will include protocol messages in which, among other things, the destination server identifies itself, grants permission to upload a message for a named recipient, and acknowledges that the message was received. RPost will save the record of this transaction in such way that it may be later retrieved and included in or attached to the RPost Delivery Receipt for this message.

For various reasons RPost may not be able to achieve an SMTP connection with an MTA of a recipient or it may achieve such a connection but be denied permission to transmit the message by the recipient. In that case, if the internet DNS lookup reveals that the destination address is served by multiple MTAs, the RPost server 14 will attempt to deliver its message to each of these in turn. RPost will continue to attempt to deliver to an appropriate MTA as often as system resources permit. If, after a length of time, RPost cannot deliver the message to an address, it will mark the status of this recipient of this message as "UNDELIVERABLE" and stop attempting to send this message to this destination address.

When the RPost server 14 succeeds in transmitting a message to a destination Server that explicitly supports ESMTP DSN, RPost will record the status of this recipient for this message as "DELIVERED-AND-WAITING-FOR-DSN".

When the RPost server 14 succeeds in transmitting a message to the destination Server via a connection that does not explicitly support ESMTP DSN, RPost will record the status of this recipient for this message as "DELIVERED."

I.3. Postprocessing

DSN Processing

MTA DSNs will be returned to the RPost server 14 addressed to fictitious addresses in its proprietary domain (e.g. "RPost.com"), these addresses having been constructed as described above. The RPost server 14 will scan all inbound mail addressed to the domain and detect DSN messages by their identifying substring (e.g. "rcpt"). By parsing these addresses in the manner described above, the system can identify the message and the recipient that has prompted the DSN notification.

There is no standard format for DSN messages; neither is there any standard lexicon in which they report their results. To evaluate a received DSN the system should look in the subject line and the body of DSN messages for words and phrases that express the DSN's meaning. For example, such phrases as "successful delivery" or "delivered to mailbox" or "was delivered" normally signal that the message the DSN concerns was deposited to the mailbox of the destination. When it detects such phrases the System will change the Delivery Status of this destination of the message to "DELIVERED TO MAILBOX".

Phrases such as "could not be delivered", "fatal error", "failure" and "unsuccessful" typically signal a DSN that reports a failure by the MTA to deliver the message to the destination. When it detects phrases such as these in the DSN, the system will change the record of the recipient's Delivery Status to "FAILED".

Though the system always delivers mail to a proprietary MTA for the destination's domain, these MTAs will sometimes relay the message to a different server (as may be the case, for example, if the receiving MTA sends mail behind a firewall). In this case the DSN will contain such phrases as "relayed" or "relayed onward". In such cases the system will change the recipient's Delivery Status to "RELAYED".

Having evaluated the DSN and updated the recipient's Delivery Status accordingly, the system will save the DSN and any attachments it may contain in such a way that this message(s) may be included in and/or attached to an RPost Delivery Receipt.

Message Management

From time to time the system will scan each sent message and examine the status of each destination of that message in order to determine if the system has completed processing of that destination's delivery. The criteria for completion depend upon the destination's Delivery Status:

DELIVERED: This status indicates that a copy of the message for this recipient has been delivered to an MTA that does not support ESMTP DSN. Such an MTA may nevertheless send a form of Delivery Status Notification in the event that the message could not be delivered to the Mailbox of the addressee (as might happen, for example, if the destination address does not correspond to a valid account within the domain). Accordingly, the system will not treat the delivery for such a recipient as completed until a period of time has elapsed since the delivery to the recipient MTA. This time period—typically two to twenty-four hours—represents an estimate of the maximum time required for a majority of servers to return a notification of a failure to deliver and it may be adjusted if the specific destination domain is remote or known to be prompt or tardy in producing such notifications.

RELAYED: This status signifies that a DSN has been received that indicates that the recipient MTA has forwarded the message to another MTA that does not support ESMTP DSN. In this case it is nevertheless possible that the MTA to which the message has been delivered will send a notification of failure to deliver in due course. Accordingly recipients with this status are treated as complete under the same conditions as recipients with the status DELIVERED.

DELIVERED-AND-WAITING-FOR-DSN: This status indicates that the recipient's MTA supports ESMTP DSN and that a DSN has been solicited but not yet received. It may sometimes happen that although an MTA identifies itself as supporting this service it will nevertheless not provide DSNs even in the event of successful delivery. Accordingly, the system will regard deliveries to a destination with this status as completed even if no DSN is received after an interval of time. This interval—typically six to twenty-four hours—represents an estimate of the maximum time typically required for a compliant MTA to return a DSN.

DELIVERED-TO-MAILBOX: This status indicates that a DSN indicating successful delivery has been received for this recipient and hence the delivery of the message to this destination is completed.

FAILED, UNDELIVERABLE: Deliveries to recipients with this status are always treated as complete.

When the system finds that delivery to all recipients of a message has been completed the system will construct a Delivery Receipt for the message.

Creation of Delivery Receipts

Delivery receipts are e-mails sent to the original sender of the made-of-record message. The receipt 20 may contain:

1. an identifier for administrative purposes. This identifier may be or may include reference to the sender's ID and/or the value of the internet Message-ID of the sender's message as received by the system;
2. the date and time at which the receipt was generated;
3. the quoted body of the original message together with the e-mail addresses of its intended recipients;
4. the date and time at which the RPost server received the message;
5. a table for each destination listing:
   (i) the time at which the recipient's MTA received the message and/or the time at which the system received a DSN report from the recipient's MTA;
   (ii) a Delivery Status of the message for that destination. The Delivery Status quoted in a Delivery Receipt is based upon the system's internal record of the destination's Delivery Status. They may be transcribed as follows:

Deliveries to destinations whose status is FAILED or UNDELIVERABLE will be recorded in the receipt as "failed".

Deliveries to destinations whose status is DELIVERED or DELIVERED-AND-WAITING-FOR DSN will be recorded in the receipt as "delivered to mail server".

Deliveries to recipients whose status is DELIVERED-TO-MAILBOX will be recorded in the receipt as "delivered to mail box".

The purpose of these reports is to accurately apprise the reader of the form of verification of delivery the system has been able to achieve.

6. a list of the original attachments of the e-mail together with the separate message digests of those attachments;
7. copies of the attachments to the original message, each original attachment being attached as an attachment to the receipt;
8. transcripts, summaries, or abstractions of the transcripts of all of the SMTP dialogs involved in the delivery of the message to each destination;
9. quotations from the bodies and the attachments of all received DSN reports including whatever details of delivery or disposition of the message that they might reveal; and
10. any files that were returned to the system as attachments to DSN reports.

All of these separate elements of the receipt may have their own message digests or digital signatures included within the receipt. Additionally, the receipt may include a single overall encrypted message digest or digital signature computed and appended as part of the receipt, thus providing a single message authentication code which could be used to authenticate all of the information contained within the receipt. Since the receipt itself and SMTP dialogs and DSN reports within the receipt contain time-stamps, the receipt includes a non-forgeable record of the message recipient(s), the message content, and the time(s) and route(s) of delivery.

MUA Notification Processing

MUA Notifications could be collected and incorporated within RPost Delivery receipts in the same manner as MTA DSNs. However, MTA notifications are typically issued by receiving MTAs within a few hours of delivery whereas MUA Notifications will not be generated, if ever, until the recipient opens his MUA e-mail client and takes some action with respect to the received mail. For this reason, in this embodiment of the invention MUA notifications are collected separately from MTA notifications and reported in "RPost Reading Receipts" separate from RPost Delivery Receipts.

MUA notifications elicited by message headers constructed in the manner described above will be returned to a common RPost address (e.g. "readreceipts@RPost.com") and each notification will contain—in the name field of its address—the address of the original sender of this message. Because this is the only information required to generate an RPost reading receipt in the manner described below, the system can deal with MUA notices whenever these notices may arrive and without any need to have stored any information about the original message in its databanks.

MUA notices may report, among other things, that a message has been read by a recipient, that a message has been displayed on the recipient's terminal (whether or not read), that a message has been deleted without having been opened. There is no protocol-governed standard for the content or format of MUA messages. The system could be configured so as to examine the text of MUAs to interpret their reports in the same fashion as the system uses for MTA DSNs. However, in the current embodiment of the invention, MUAs are not evaluated or interpreted by the RPost server 14 but are, instead, passed on to the sender for his own evaluation in a form that can be authenticated by RPost. To accomplish this the system will create an e-mail message styled as an "RPost Reading Notice" which may include, among other items:

1. subject line of the received MUA notice;
2. the body of the received MUA notice quoted as the body of the Reading Notice;
3. the received MUA notice included as an attachment;
4. any attachment(s) to the received MUA notice included as an attachment(s).
5. message digests of the received MUA notice and of any attachment(s) to that notice;
6. a date and time stamp;
7. an encrypted hash of at least items 5 and 6 providing an authenticatible date stamped digital signature for the document and all of its contents.

Receipt Disposition

In the case of the current embodiment of the invention, both RPost delivery receipts and Reading Notices are sent to the original sender of the made-of-record message. Since these receipts are digitally signed with an encrypted hash, RPost can authenticate the information contained in these messages any time they are presented to RPost for this purpose, in the manner described below. This means that once it has transmitted a copy of the receipt to its sender (with instructions to the sender to retain the receipt for his records), RPost has no further need to retain any data concerning the message or its delivery and may expunge all such records from its system. Thus, RPost need not keep any copy of the original message or the receipt. This economy of archival memory gives the present invention an advantage over various prior art message authentication systems that required large amounts of data storage at the service provider side.

In this case the burden of retaining receipt data falls on the original sender of the message. Alternatively or additionally, third party verifier RPost may, perhaps for an additional fee, store a permanent copy of the receipt or of some or all receipt data. The receipt or part(s) thereof may be kept on any suitable archival storage devices including magnetic tape, CD ROM, or other storage device types. Additionally or alternatively, RPost may return receipts or parts thereof to a storage system devoted to this purpose within the control of the sender or the sender's organization.

As described above, RPost receipt information includes all of the data from the original sender's message and its attachments. There are circumstances in which users of the system might not wish to undertake the burden of retaining receipts in their records (e.g., out of fear of accidental data loss) but might also not wish to have the contents of their message in the hands of the RPost third party. Accordingly RPost might discard the contents of messages but store in its database only such information (e.g. sender, date of composition, message digests, destinations and Delivery Statuses) as might be provided by RPost to authenticate and verify the delivery of a message when presented with a copy of the message retained by the sender.

Verification

In the event that the originator of a message requires evidence at a later date that an e-mail was sent, delivered, and/or read, the originator presents the receipt(s) for the message to the operators of the system.

For example, in order to prove that a particular message was sent from sender 10 to recipient 18, sender 10 sends to RPost a copy of receipt 20 with a request to verify the information contained within the receipt. This could be done by sending the receipt to a predefined mailbox at RPost, e.g., verify@RPost.com. RPost then determines whether or not the receipt is a valid receipt. A receipt is a valid receipt if the digital signature matches the remainder of the receipt, and the message digests match the corresponding respective portions of the original message. Specifically, RPost performs the hash function on the various portions of the message including the message body, the attachments, and the overall message including the SMTP dialog and DSN reports, to produce one or more message digests corresponding to the purported message copy. RPost compares the message digests in the purported copy, including the overall message digest, with the message digests which RPost has computed from the purported message copy. The overall message digest can be compared by either decrypting the overall message digest received as the digital signature in the purported receipt, or by encrypting the overall message digest which was calculated from the purported message copy. If the message digests including the digital signature match, then the receipt is an authentic RPost-generated receipt. Assuming that a good hash function was used and that the keys used in the cryptographic hash function and the digital signature encryption algorithm have not been divulged to others, it is virtually impossible that the receipt has been "forged" by the person presenting the receipt. That is, the receipt must have been a receipt that was generated by RPost, and therefore the message contained in the receipt, the to/from information, the date and time of delivery, the fact of successful delivery, the route by which the message traveled, and any DSN information contained within the receipt, must be a true copy of that information and is accurate. RPost can then provide authentication, verification, and confirmation of the information contained within the receipt. This confirmation can take the form of an e-mail confirmation, affidavit testimony from RPost employees familiar with the methods used by RPost, live sworn testimony in depositions and in court, and other forms of testimony. RPost can charge sender 10, recipient 18, or any other entity, fees for the various respective confirmation services. RPost can also provide testimony or other confirmation with regard to the non-authenticity of a purported receipt. Testimony may be provided in accordance with Federal Rules of Evidence 901(9), 901(10), 803(6), 803(7), 1001-1004, 1006, 702-706, corresponding state rules of evidence, and other applicable rules.

In sum, the system provides reliable evidence based on the testimony of a disinterested third party that a particular message having a particular content was sent, when it was sent, who sent it, who received it, when it was opened for reading, and when it was deleted. This evidence can be presented any time a dispute arises regarding the content and delivery of messages, as for example in contract formation, the timing of stock buy or sell orders, and many other applications. The operators of the system can attest to the accuracy of the information contained in the receipt itself without the need for the operators to preserve any record or copy of the information contained in the receipt.

A significant advantage of the system is that it can be used by existing MUAs without any change thereto. Because all the computation, encryption, ESMTP interrogation and dialog, DSN report collection, and receipt compilation, are performed by the third party RPost server 14, none of these functions need to be implemented within any of the user's equipment. Thus, users can take advantage of the system quickly and easily.

In the embodiment of the invention described above, the RPost server 14 makes of record the delivery of all messages passing through it. Alternatively, an RPost server 14 might make of record only those messages having certain destinations (e.g. external to an organization) or from certain senders (e.g. a customer relations group). Alternatively or additionally, the RPost server 14 might make of record only those messages that had distinguishing characters or strings in the subject or body of the message. For example, the server might make of record only messages that the sender had included "(Make of Record)" or "(MR)" in the subject of the message. All other messages might be delivered by the RPost server 14 or some other server function as an ordinary internet MTA.

In this embodiment, RPost can raise revenue in a variety of ways. For instance: RPost can charge message sender 10 or her organization a fee on a per-message basis, on a per-kilobyte basis, on a flat fee periodic basis such as monthly, or on a combination of the above. RPost can also charge fees for authenticating and verifying a receipt, with a schedule of charges depending on whether the verification sought is a simple return e-mail, a written affidavit or declaration, sworn fact testimony in deposition or in court, or sworn expert testimony in deposition or in court. If the users opt to have RPost retain copies of the receipts, RPost can charge per item and/or per-kilobyte per month storage fees.

Flow Diagram for Making of Record an Outgoing Message

FIGS. 2A-2G constitute a flow chart showing an exemplary operation of the first embodiment of the system. Modifying this flow chart to apply to other embodiments is within the skill of one familiar with software and e-mail protocols.

FIG. 3A, Pre-processing, illustrates the steps taken with a message before it will be transmitted by the Making of Record Server (the System).

To make of record an e-mail message, in step 201 an originator/sender/user creates an e-mail message using any internet Mail User Agent (MUA). Possible MUAs include: (1) client side e-mail programs; (2) server based e-mail programs; (3) web based e-mail services; and (4) HTML forms submitted through web pages. The message may contain attached files as described in the Requests for Comments (RFCs) 822, 2046, and 2047, which are hereby incorporated by reference. RFCs are a series of notes regarding the internet that discuss many aspects of computer communication, focusing on networking protocols, procedures, programs, and concepts.

In this embodiment, the system functions as the sender's outgoing mail server and hence the sender's message will be directly transferred to the RPost server by the sender's MUA (step 202).

In step 203, the system creates a copy of the original message to be stored for later processing.

In step 204, the system creates a record in a database which may include such information as: the time at which the message was received by the server, the names and size(s) of the file attachment(s) of the message, the name (if known) of each destination of the message; the internet address of each destination; the time at which the message was delivered to the destination's MTA (initially this value is null) and a unit which records the Delivery Status of each destination.

In step 205, the Delivery Status of each destination is set to "UNSENT".

In step 206, the system generates and stores a message digest or digital signature generated from the message body.

In step 207, the system generates and stores a hash or message digest for each attachment included in the message.

In step 208, the system may create a modified copy of the original message. In this second copy (step 209), the original subject line of the message may be amended to indicate that this copy is made of record (e.g. by pre-pending "Made of Record").

In step 210, a notice that the message is made of record by the system together with links to the system's Word Wide Web site may be appended to the body of the message.

In step 211, the e-mail headers may be added requesting reading notification in a variety of header formats recognized by various MUAs. The requests for notification direct the return notification to an address associated with the system: for example, "readreceipt@RPost.com". These headers will also include the address of the original sender of the message in the name field of the address to which the MUA notification should be sent.

Figures 1, 2B:
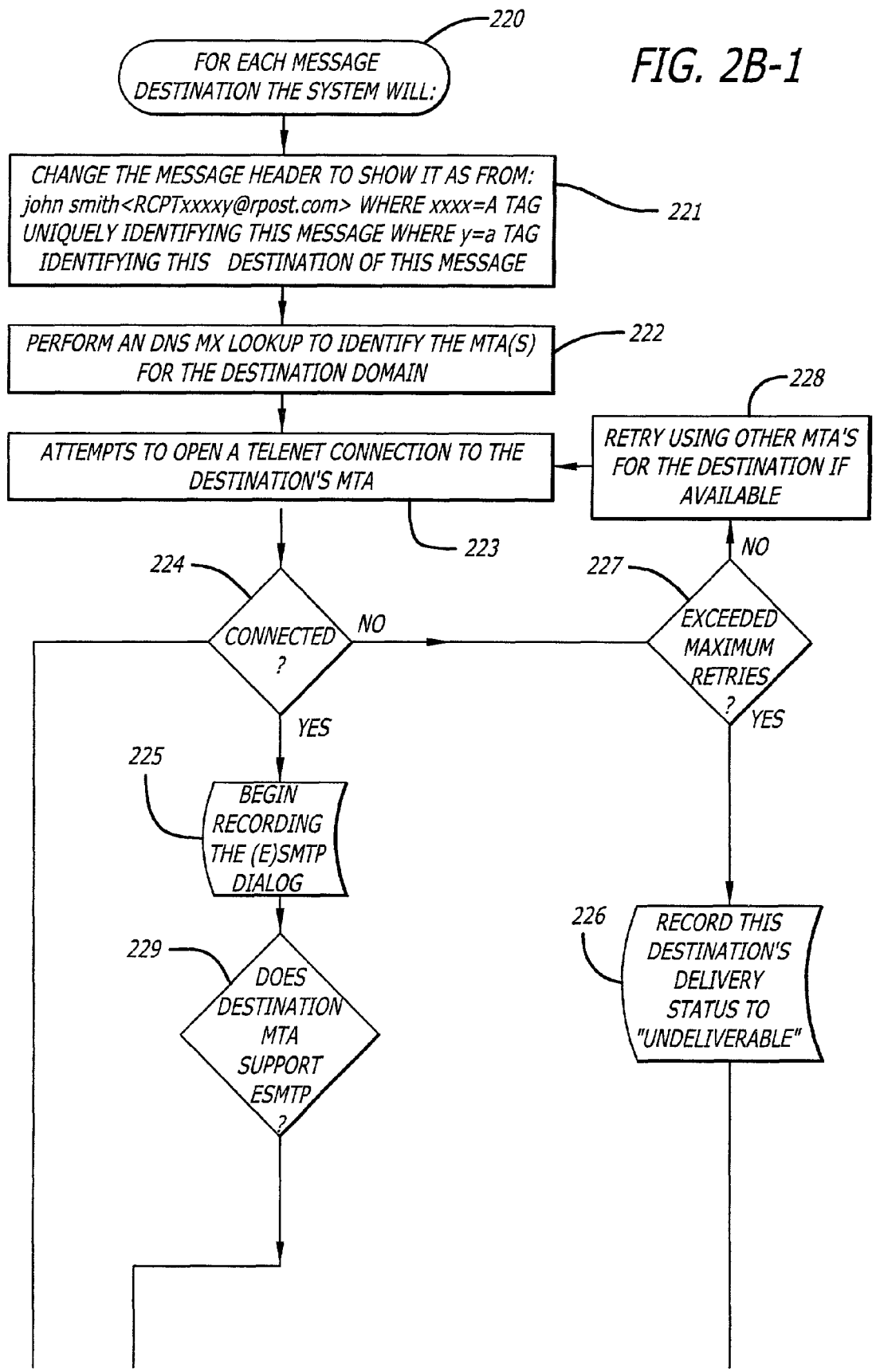
Figures 2, 2B:
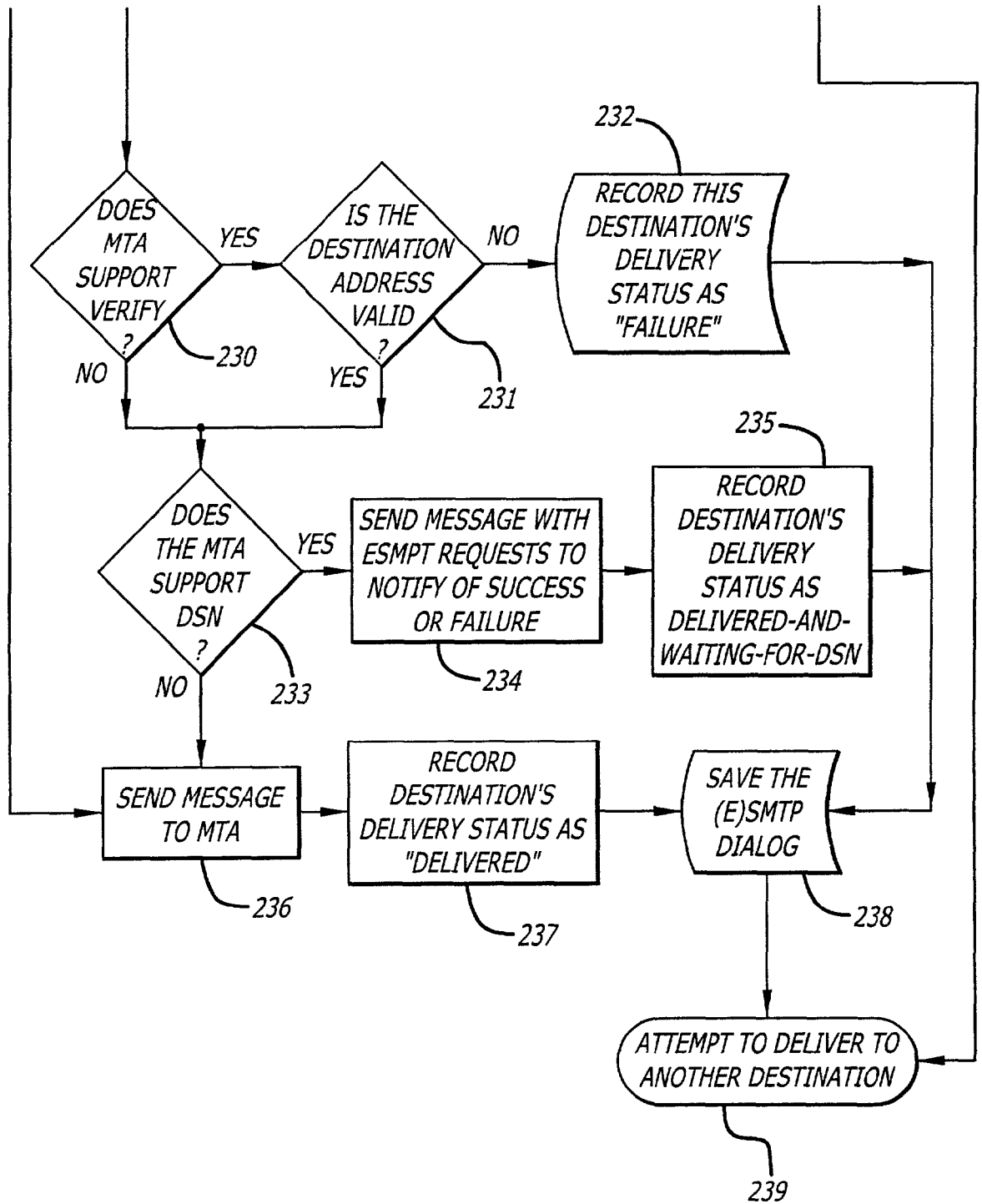
FIGS. 2-2F constitute a representative flow diagram for making an outgoing e-mail of record according to the embodiment of FIG. 1.

Preprocessing having been completed, the system will now transmit a copy of the message to each of its destinations as illustrated in FIG. 2B.

FIG. 2B illustrates the steps provided to transmit a message made of record. As step 220 indicates, the process provides a separate transmission for each recipient of the message.

In step 221, the system changes the header field of its working copy of the message to show the message as being "FROM:" a sender whose name is the original sender of the message but whose address is an "RPost.com" address constructed from:
a) a string used to identify returning MTA notifications (e.g. "RCPT");
b) a string which uniquely identifies the message being sent;
c) a tag which uniquely identifies the destination this copy of the message is being sent to.

In step 222, using the domain name of the destination currently being sent to, the system does a Domain Name Server Mail exchange lookup to find the address of the MTA(s) responsible for collecting mail for addresses in this domain.

In step 223, the system attempts to make a direct telnet connection to the MTA of the destination. If the connection fails, the system will try to make the connection again. Provided that the system has not exceed a maximum number of retries (227) for this destination, the system will try to remake the connection perhaps using another MX server for the destination's domain (228).

If, after a maximum number of retries, the system cannot connect to an MTA for this destination, the system will, as in step 226, record this destination's Delivery Status as "UNDELIVERABLE" and cease attempting to deliver this message to this destination.

On connecting to the destination's MTA, the system will begin making a record of its (E)SMTP dialog with the MTA (225).

In step 229, the system attempts to initiate an Extended SMTP (ESMTP) exchange with the destination MTA by issuing an "EHLO" greeting.

If the destination's MTS supports ESMTP, the system will then (230) determine if the destination MTA supports the SMTP function VERIFY. If the MTA supports VERIFY, the system will attempt to determine if the destination address is a valid address within the domain (231).

If the address is not valid, then, as in step 232, the system will record the Delivery Status of this destination as "FAILURE" and will cease attempting to deliver this message to this destination.

If the address is valid or if the ESMTP server does not support VERIFY, the system will then (233) determine if the receiving MTA supports the ESMTP service DSN (Delivery Status Notification).

If the MTA does support ESMTP DSN, the system will transmit the message with ESMTP requests to notify the nominal sender of the message of delivery success or failure (234). Having transmitted the message, the system will record the Delivery Status of this destination as "DELIVERED-AND-WAITING-FOR-DSN" (235).

If the receiving MTA does not support Extended SMTP, the system will transmit the message using SMTP (236) and record the destination's status as "DELIVERED" (237).

Having delivered the message, the system will then store the (E)SMTP dialog, recording the delivery in a manner in which it can later be recovered (238) and attempt to send the message to another destination.

Figure 2C:
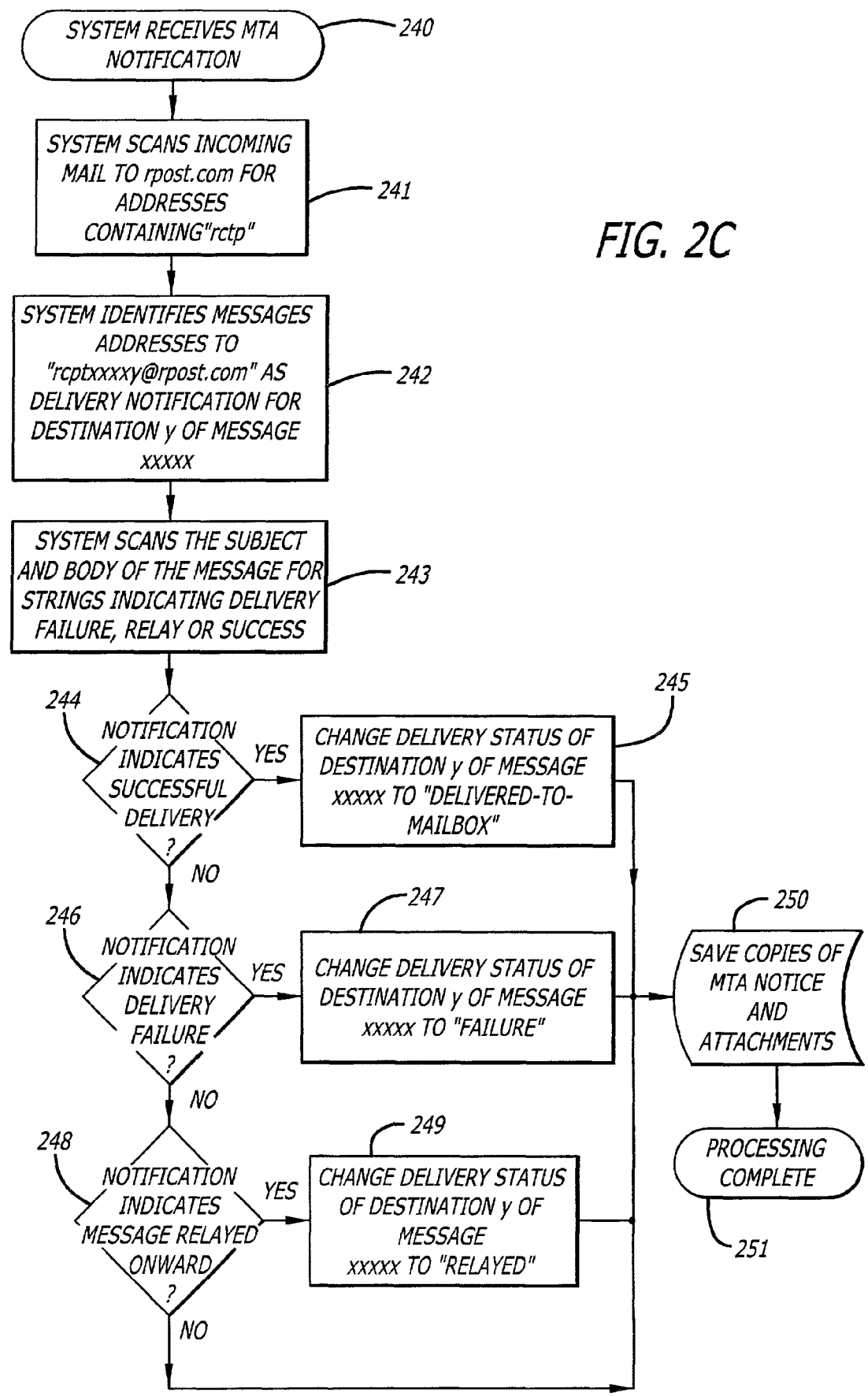

Having transmitted a message to its destination(s), the system must perform several functions in order to gather information about the message's disposition. FIG. 2C illustrates the process by which the system processes MTA Notifications returned by recipient MTAs.

Because of the format used in the headers of sent messages illustrated in FIG. 2B step 221, MTA message notifications will be delivered to a fictional local address at the server. The system will be able to detect these notifications by a string (e.g. "rcpt") embedded in their addresses (241). By parsing the address, as illustrated in 242, the system can determine which message to which destination prompted the received notification.

In step 243, the system scans the subject line and the body of received MTAs for phrases that indicate whether the MTA is reporting a successful delivery, a failed delivery, or that the message has been relayed to another server.

In the event that the process at step 243 reveals that the notification is reporting a successful delivery, the system will, as illustrated in step 245, change the Delivery Status of the relevant destination of the relevant message to "DELIVERED-TO-MAILBOX".

If the system determines that the MTA notice is reporting a delivery failure, the system will (247) change the Delivery Status of the relevant destination of the relevant message to "FAILURE".

In the event that the system determines that the MTA notification indicates that the message was relayed to another server, the system will, as illustrated in step 249, change the Delivery Status of the relevant destination of the relevant message to "RELAYED".

Having processed the MTA Notification, the system will save this message and all of its attachments in such manner that they may be later recalled and used in construction of a receipt for this destination (250).

Figure 2D:
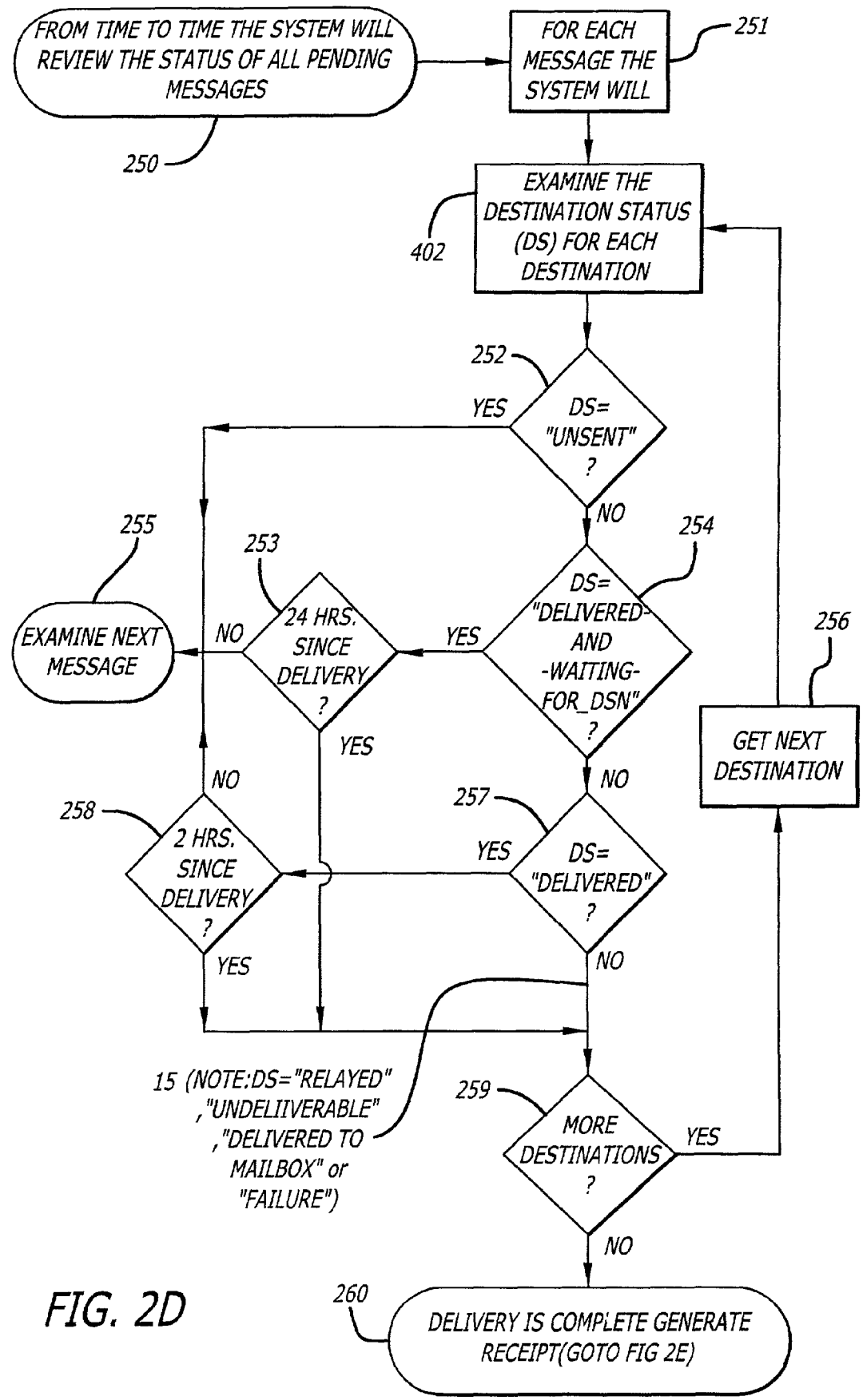

From time to time, as illustrated in FIG. 2D, the system will examine the status of each message to determine if the system has recovered all of the MTA notifications it is likely to receive for each destination of message and may hence proceed to construct a receipt for the message.

The system will examine the Delivery Status of each destination of the message.

If any destination has the Delivery Status "UNSENT", then the processing of the message is not complete. (252).

If the Delivery Status of a destination is "DELIVERED-AND-WAITING-FOR-DSN", then the system will not regard the processing for this destination as complete unless, as is illustrated in step 254, the time since delivery of the message has exceeded the system's waiting period (e.g. 24 hrs.).

If the Delivery Status of a destination is "DELIVERED", (257) then the system will regard the processing of this destination as complete provided (258) that a period of time has elapsed which the operators of the system treat as sufficient to have received notice of delivery failure from the destination's MTA. (e.g. 2 hours).

Any other destination Delivery Status (e.g. "FAILED", "UNDELIVER-ABLE", "DELIVERED TO MAILBOX") is treated as having completed processing.

If processing of any of a message's destinations is not complete the system takes no action but moves to consider other messages in the system (step 255).

However, as illustrated in step 259, if processing of every destination of the message is complete, the system will generate a Delivery Receipt for the message.

Figure 2E:
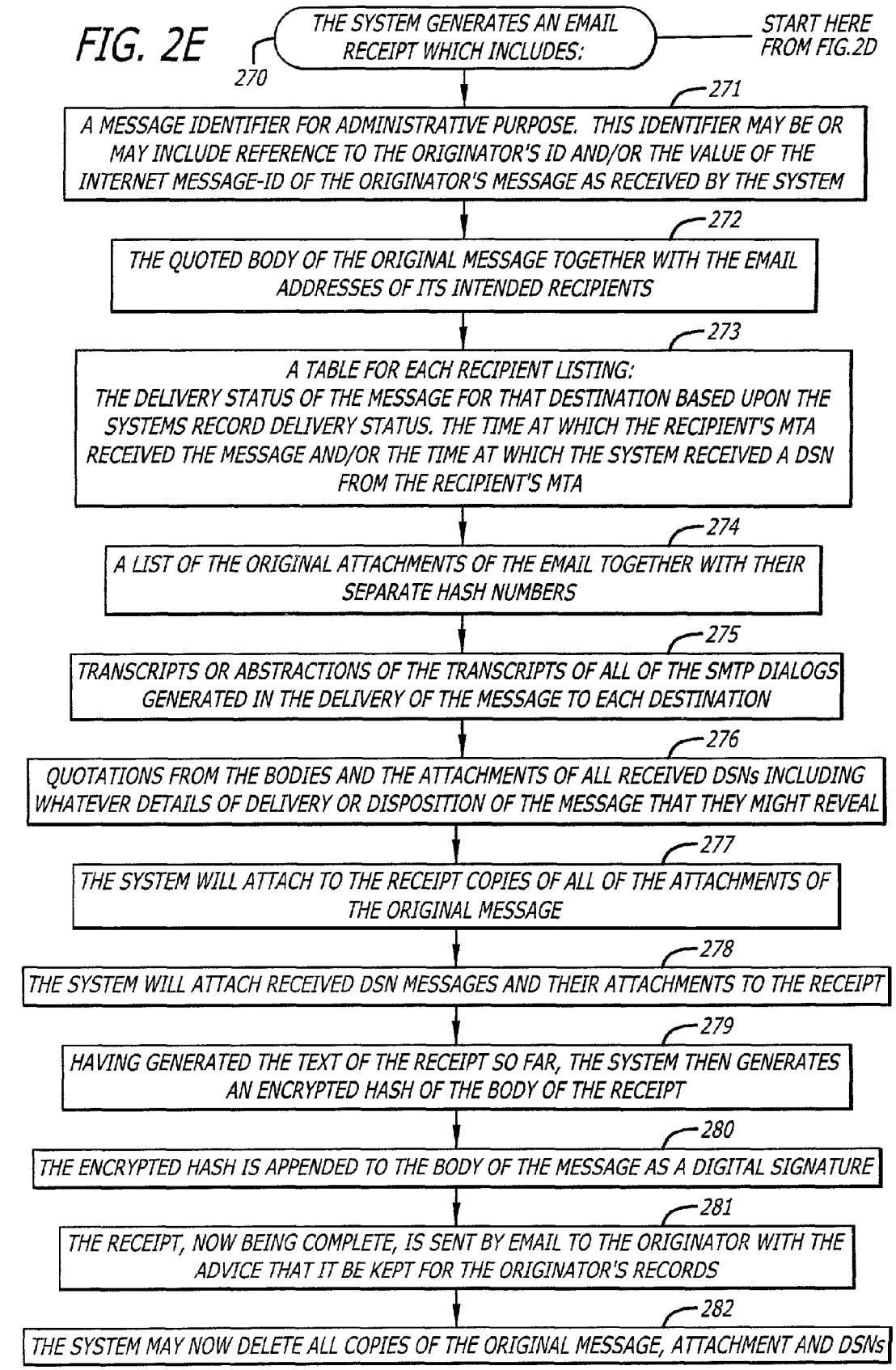

As illustrated by way of example in FIG. 2E, the receipt may include:

An identifier for administrative purposes as in block 271. This identifier may be, or may include, reference to the sender's ID and/or the value of the internet Message-ID of the sender's message as received by the system.

As in block 272, the quoted body of the original message 12 together with the e-mail addresses of its intended recipients may also be included.

As in block 273, a table for each recipient listing may include:
a) the time at which the recipient's MTA received the message and/or the time at which the system received DSN from the recipient's MTA;
b) the Delivery Status report of the message for that destination, i.e., "Delivered to Mail Server", "Delivered to Mail Box", "Relayed", "Delivery Failure", or "Undeliverable".

As in block 274, a list of the original attachments of the e-mail together with their separate hash values or message digests.

As in block 275, transcripts or abstractions of the transcripts of all of the SMTP dialogs involved in the delivery of the message to each destination.

As in block 276, quotations from the bodies and the attachments of all received DSNs including whatever details of delivery or disposition of the message that they might reveal.

As in block 277, the system may attach to the receipt copies of all of the attachments of the original message, and, as in block 278, the system may additionally attach files returned to the system as attachments to DSNs.

In step 279, having generated the text of the receipt so far, the system then generates a first hash for the e-mail message and a second hash(es) for any attachments to the body of the receipt and calculates a digital signature for each of the hash(es) using an encryption key known only to the operators of the system. Encryption can employ, for example, the Data Encryption Standard described in Federal Information Processing Standard Publication 4-2 (FIPS PUB 46-2), the Data Encryption Standard, National Institute of Standards and Technology, which is hereby incorporated by reference. Alternatively, other known or new methods of encrypting the hash value may be used.

In step 280, the encrypted hash is then appended to the end of the message as the "document digital signature".

In step 281, the receipt 20, now being complete, may be sent by e-mail to the sender with the advice that it be kept for the sender's records. In step 282, the system may now delete all copies of the original message, attachments, and DSNs. Alternatively, rather than sending the receipt to the sender, the system may store the receipt, or both the sender and system can store the receipt.

Because MUA notifications are returned only at the option of the recipient and only when the recipient takes some action with respect to the received message, embodiments of the system may choose to treat these return messages differently than MTA notifications.

Figure 2F:
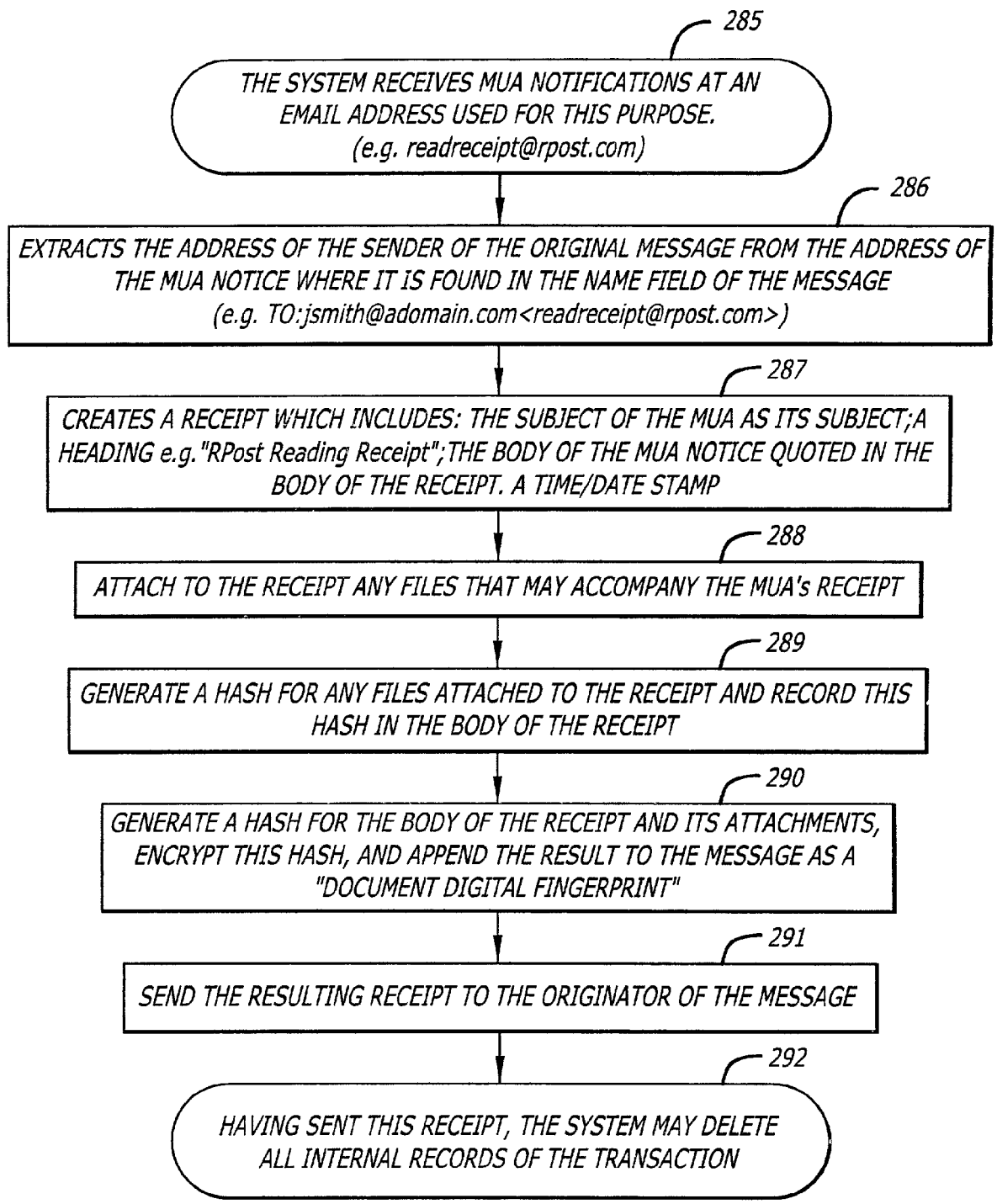

FIG. 2F illustrates how these MUA notifications may be treated by the system. MUA notifications are solicited by the system by including various headers in outgoing messages in the manner of FIG. 2A, step 211. These headers direct compliant MUAs to send notifications to a system address (e.g. "readreciept@RPost.com") set aside for this purpose. The headers also use, in the "name" field of this return address, the e-mail address of the original sender of the message. Accordingly, in step 286, when MUA notifications are returned to readreceipt@RPost.com the system can, by examining the address of the notification, determine the address to which a reading notification should be sent.

Upon the arrival of a read receipt from a destination's MUA, the system, in step 287, generates a reading receipt that contains the subject of the received MUA notification as its subject and incorporates, in its message body, the body of the received MUA Notification.

In step 288, the system attaches to the receipt any files that may accompany the MUA's receipt (typically these may include details of delivery or disposition and identifying references to the original e-mail.)

In step 289, the system generates a hash for any files attached to the receipt and records this hash in the body of the receipt.

In step 290, the system generates a hash for the body of the receipt and its attachments, encrypts this hash, and appends the result to the message as a "document digital signature".

In step 291, the system sends the resulting receipt to the sender of the message. In step 292, having sent this receipt, the system may delete all internal records of the transaction.

III. Rpost as Secondary Maid Server Embodiment

Figure 3:
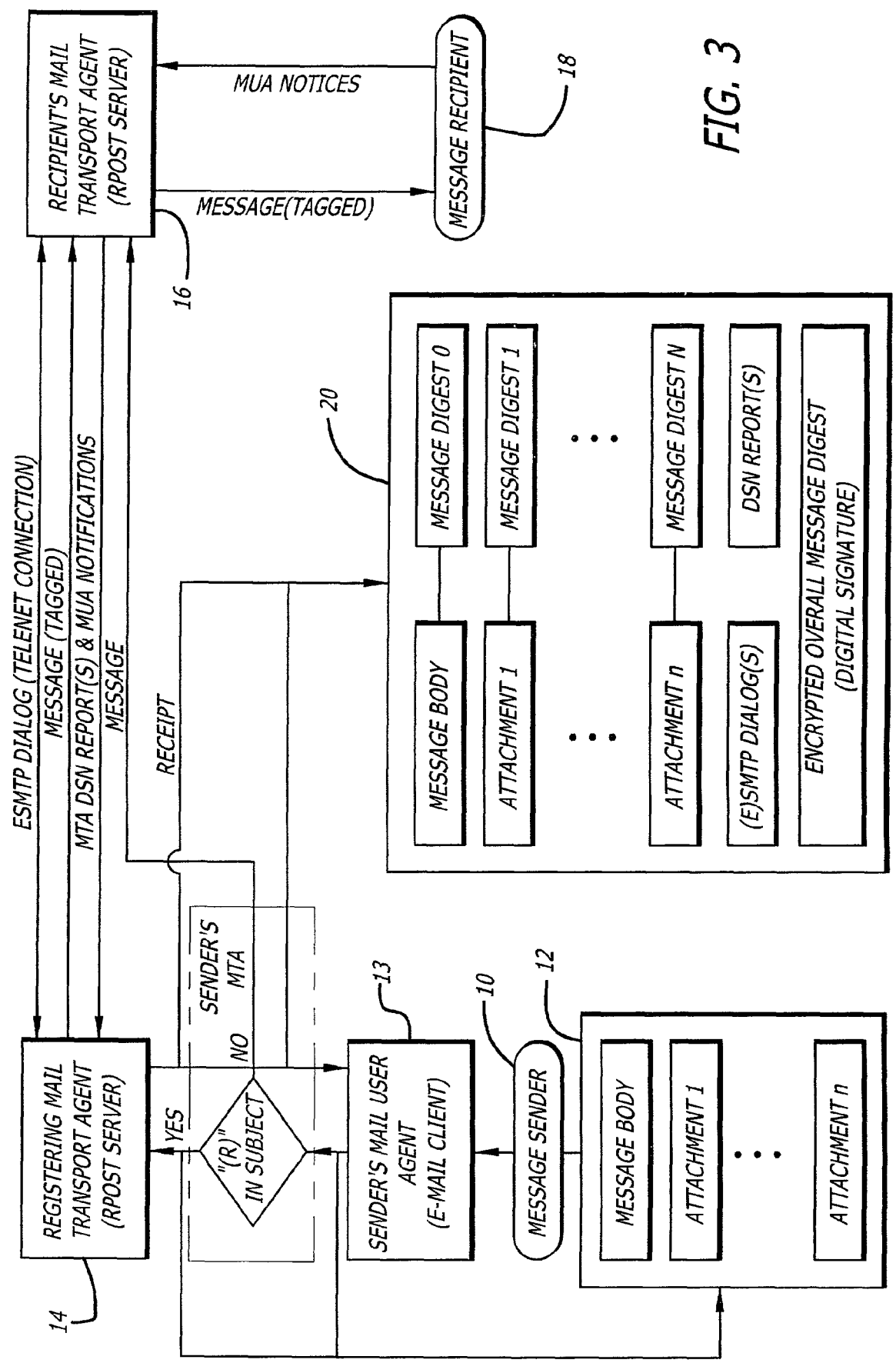
FIG. 3 is a system diagram of a second embodiment of the invention disclosed and claimed in co-pending application Ser. No. 09/626,577, in which embodiment senders may direct a Mail Transport Agent to transmit selected messages through a separate Mail Transport Agent constructed to make the selected messages of record.

FIG. 3 is a system diagram of a second embodiment of the present invention wherein the RPost server 14 does not serve as the user's primary MTA but rather works in collaboration with another MTA. In this embodiment, the sender may elect to make of record a particular outgoing message by including some form of flag in an outgoing message, message subject, or message addresses. For example, if and only if a sender includes the symbol "(Made of Record)" or '(MR)" in the subject of the message the sender's MTA will direct the message to be transmitted through the RPost server 14 to generate a receipt.

In this embodiment the operators of RPost receive revenues from the operator of the sender's MTA per message and/or per kilobyte transmitted.

IV. CC to Rpost Embodiment

Figure 4:
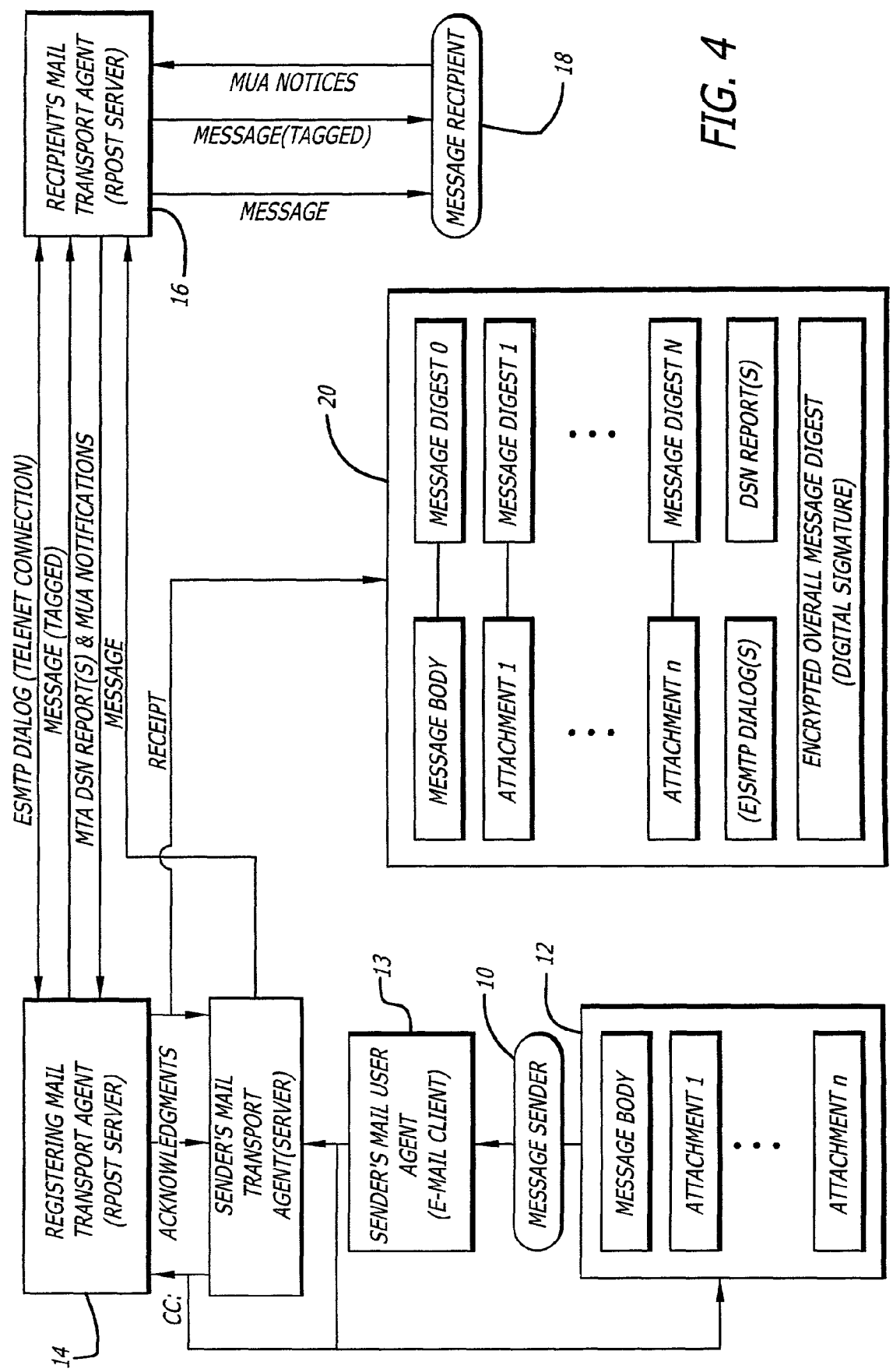
FIG. 4 is a system diagram of a third embodiment of the invention disclosed and claimed in co-pending application Ser. No. 09/626,577, in which carbon copies (cc's) of outgoing messages are sent to a special server to be made of record.

FIG. 4 is a system diagram of a third embodiment in which a carbon copy ("cc") is sent to the RPost server 14. In this embodiment, the user or message sender 10 can use a standard MUA and standard MTA without modification. Message sender 10 composes the e-mail having a message body and any number of attachments, and addresses it to message recipient 18, along with any carbon copies (cc's) and blind carbon copies (bcc's) as desired. Additionally, message sender 10 addresses a cc to RPost. RPost server 14 tags the message as before, and sends the tagged message including attachments to the recipient's MTA 16 and any designated cc's. On receipt of such a copy RPost server 14 may send an e-mail acknowledging receipt of the copy.

Recipient 18 and other destinations of the message will now receive two versions of the same message: a first version of the message received directly from sender 10, and a second and tagged version which was forwarded from RPost. Once RPost receives confirmation from recipient MTA 16 that the tagged version of the message was successfully received by recipient MTA 16, RPost server 14 composes message receipt 20 as before and sends the receipt to sender 10 for his records.

Revenue can be generated by establishing accounts for message originating domains or individual message senders, and charging the users' accounts per message, per kilobyte, per month, or a combination of these. Revenue can also be generated for the placement of advertisements on receipts and from authentication and verification services as previously described.

V. Website Embodiment

Figure 5:
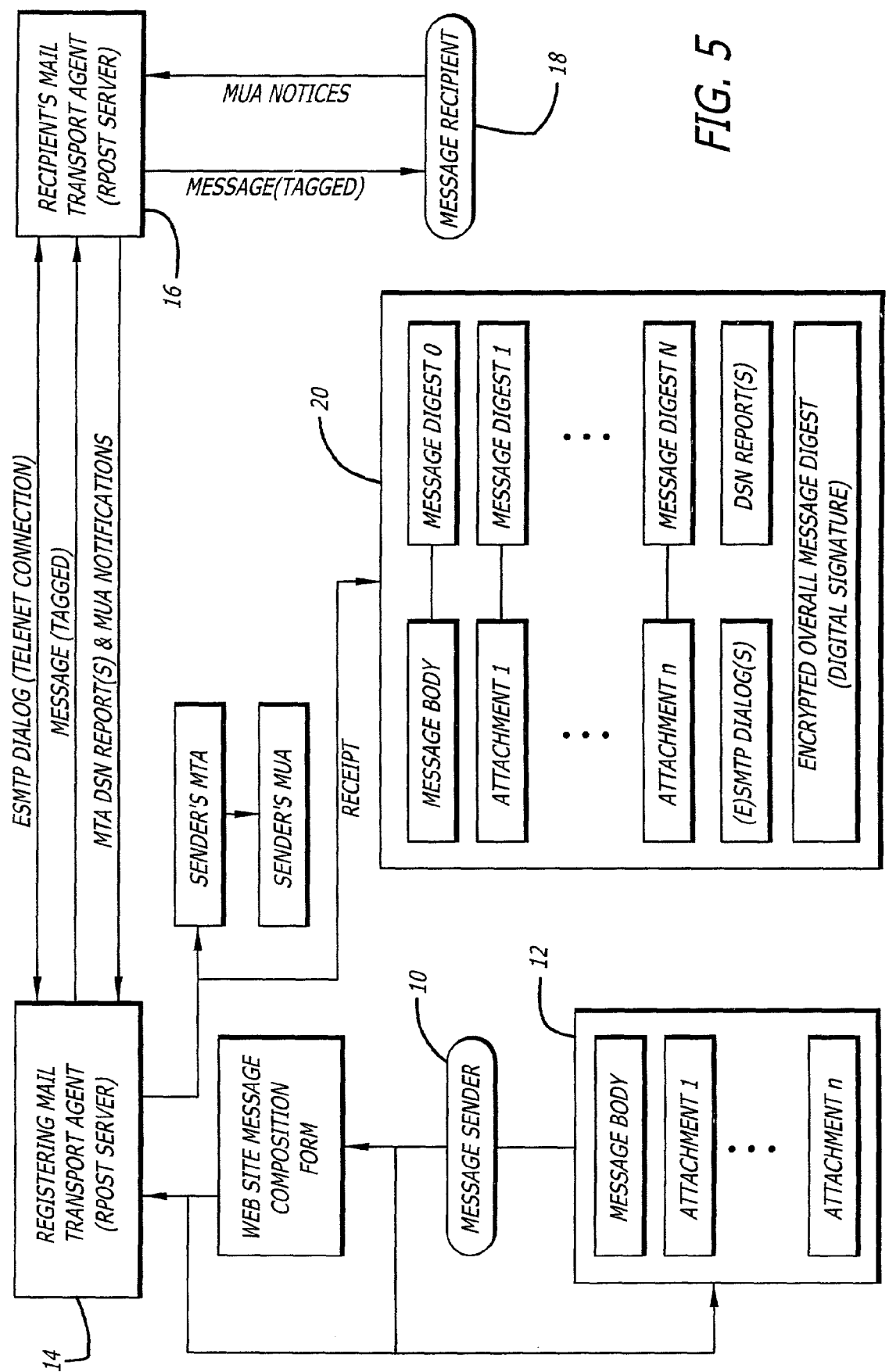
FIG. 5 is a system diagram of a fourth embodiment of the invention disclosed and claimed in co-pending application Ser. No. 09/626,577, in which embodiment users compose outgoing messages to be made of record at a designated website.

FIG. 5 is a system diagram of a fourth embodiment. In this embodiment, RPost server 14 is associated with a website at which a user composes messages. Message sender 10 visits the RPost Website and composes his message at the website by entering the desired "to", "cc", "bcc", "Subject", and message text information. Attachments can be added by using features available on standard browsers and web servers. In this embodiment, the sender additionally provides an address to which the made-of-record receipt may be sent. RPost server 14 sends the receipt to sender 10 through sender's MTA.

Revenue can be generated by establishing accounts for message originating domains or individual message senders, and charging the users' accounts per message, per kilobyte, per month, or a combination of these. Revenue can also be generated for the placement of advertisements on receipts and from authentication and verification services as previously described.

VI. Web Based MUA Embodiment

Figure 6:
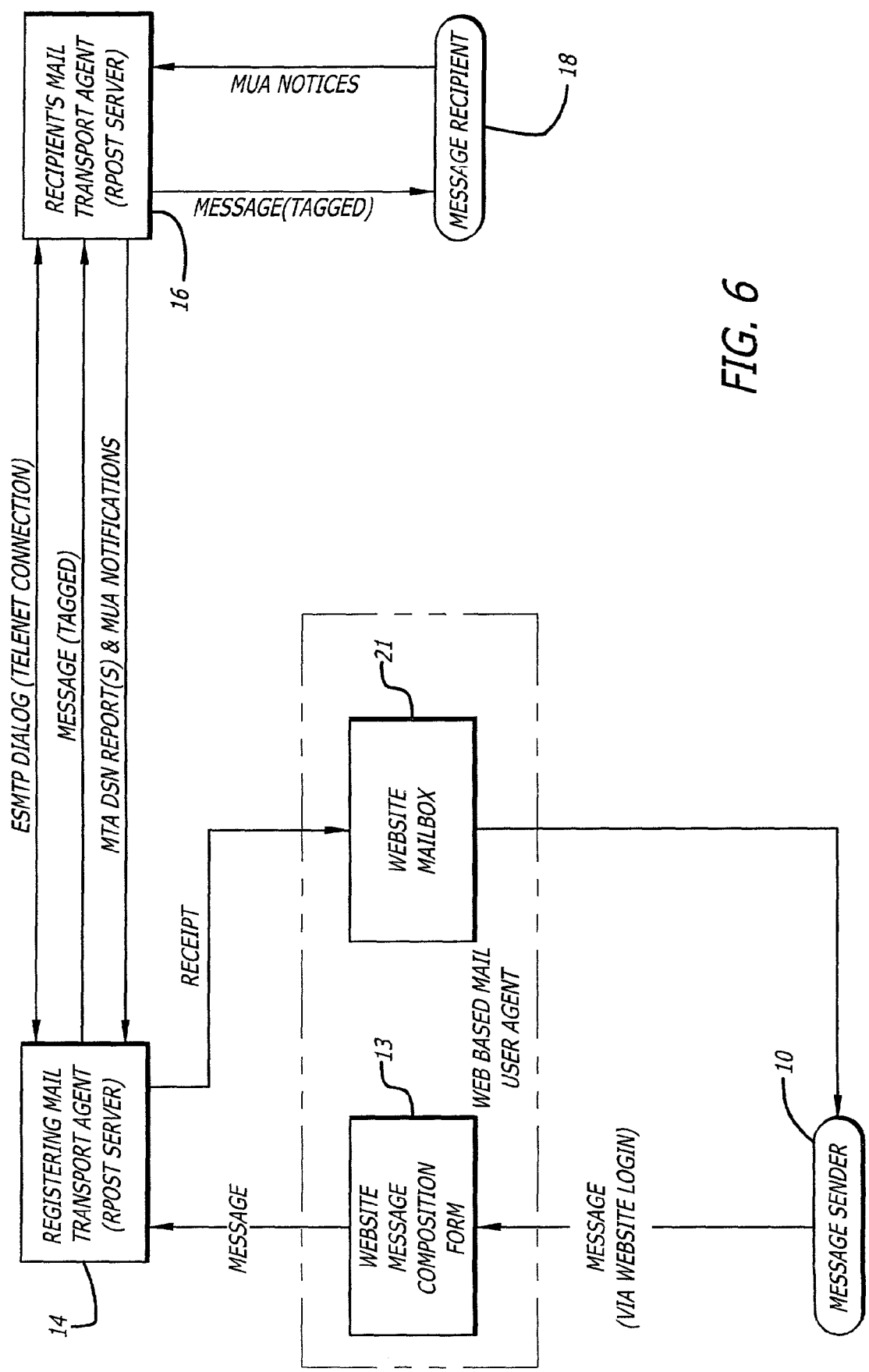
FIG. 6 is a system diagram of a fifth embodiment of the invention disclosed and claimed in co-pending application Ser. No. 09/626,577 in which users may send e-mails made of record and store receipts from within a Web Based Mail User Agent (MUA).

FIG. 6 is a system diagram of a fifth embodiment. In this embodiment, the RPost server 14 is associated with a web based Mail User Agent. In addition to allowing users to compose mail through a web browser, such a MUA provides subscribers with browser viewable mailboxes that display messages stored on the Web server site. Subscribers to such a service gain access to mail accounts with user names and passwords. In this embodiment, message sender 10 visits the RPost Website, accesses a Web Based e-mail account by entering a user name and password, and composes his message which is transported for delivery to RPost server 14. Receipts generated by the RPost server 14 are returned to a web based mailbox associated with the subscriber's account.

In addition to the revenue sources available in other embodiments, in this embodiment the operators can charge storage fees for receipts held in the web based mailbox.

In all of these embodiments, the receipt may serve as evidence that:

(1) the originator sent an e-mail message;
(2) the message was sent at a certain time;
(3) the e-mail was addressed to certain recipient(s);
(4) the e-mail was delivered to the e-mail mailbox of each of its intended recipient(s);
(5) the e-mail was delivered at a certain time;
(6) the e-mail was delivered by a certain network route; and
(7) the e-mail message and its attachments had the specific content recorded in the receipt.

Furthermore, the system under certain circumstances generates a separate receipt, which may be used as evidence that:

(1) the e-mail was inspected through the recipient's Mail User Agent (MUA); and
(2) the recipient took certain actions in response to the message, e.g., read or deleted the e-mail, at a particular time.

As with the other embodiments, this embodiment produces documented evidence which may be attested to and verified by the disinterested third party operators of the system concerning the delivery and integrity of an electronic message. In other words, the system can be thought of as transforming the e-mail to a made-of-record e-mail that can later be used to prove that a particular e-mail message was sent, that it was successfully delivered, and when and how.

Should a dispute ever arise, the dispute can be resolved through the receipt generated by the system because the receipt is so encoded that the operators of the system can determine the authenticity of the receipt as the product of the system. Thereafter, operators of the system can attest to the accuracy of the information contained in an authentic receipt, relying only on information contained in the receipt itself and without the need for the operators to preserve any record or copy of the information contained in the receipt.

In addition to these benefits, the receipts generated by the system may also be useful as evidence of the existence and authorship of such materials as might be transmitted through the system. Moreover, the system is easy to use, as the system can be used from any internet e-mail client program/MUA, so that there is no additional software required.

Flow Diagram for Validating a Receipt

Figure 7A:
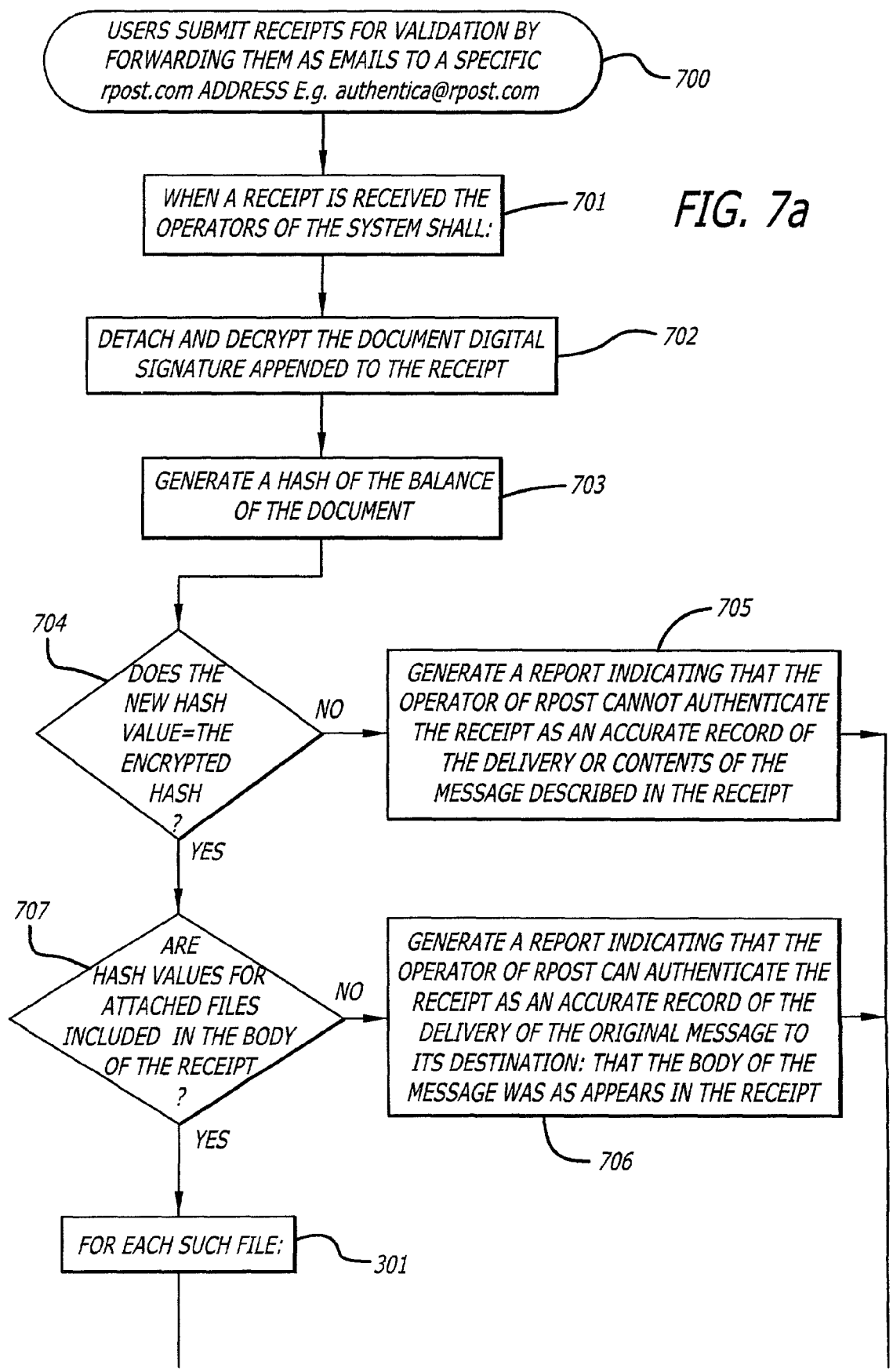
FIG. 7 is a flow diagram of a system disclosed and claimed in co-pending application 09/626,577 for validating an e-mail receipt made of record.
Figure 7B:
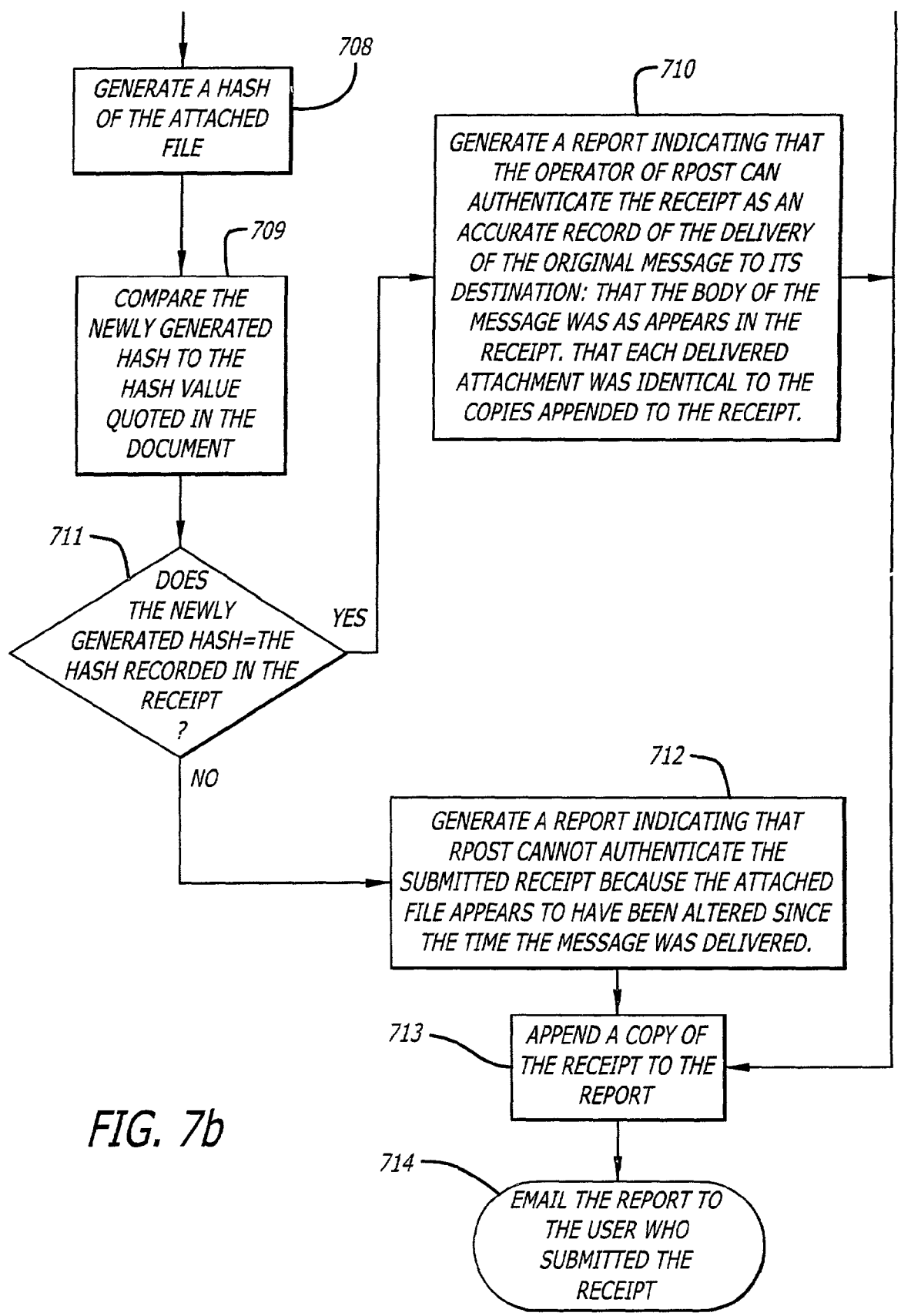

FIG. 7 is a flow diagram illustrating an exemplary method for validating a receipt. In the event that the sender of a message should require evidence that an e-mail was sent and delivered (and/or read) the sender presents the receipt(s) corresponding to the message to the operators of the system in step 700. The operators of the system then, in step 702, detach and decrypt the document digital signature appended to the receipt. In step 703, the operators generate a hash of the balance of the document, including attachments.

In step 704, if the current hash value does not match the decrypted hash value, then the system generates a report stating that RPost cannot authenticate the receipt as an accurate record of the delivery or the contents of the message described in the receipt.

If the decrypted hash is equivalent to the current hash of the message, the system can, as in step 706, warrant that the information contained in the body of the message is unchanged since the receipt passed through the system. If the original message contained no attachments, the system may now generate a report that warrants that the receipt is an accurate record of the message's contents and its delivery by the RPost server.

If the receipt reports that the original message contained attachments, then the receipt will also record the name and hash value of each attachment. In generating the receipt all attachments of the original message are attached unchanged to the receipt. Accordingly, the system will, for each such attached file, generate a hash of the attached file (708) and compare it to the hash value recorded in the body of the receipt (709).

If the calculated hash value of a file matches the value included in the receipt, the system can warrant that the file attached to the receipt is identical to that attached to the message as originally delivered. If the hashes do not match, then the system will report that it cannot warrant that the file attached to the receipt is identical to the file attached to the original message.

Having performed this calculation for each file attached to the original message, the system prepares a report which reports on the authenticity of the receipt and each of its attached files (710) or which reports the failure of validation (712).

Having completed its evaluation, the system will then append a copy of the receipt and all of its attachments to the report it has generated and send it via e-mail to the return address of the user who submitted the report for validation.

Registering Inbound E-mails

Figure 8:
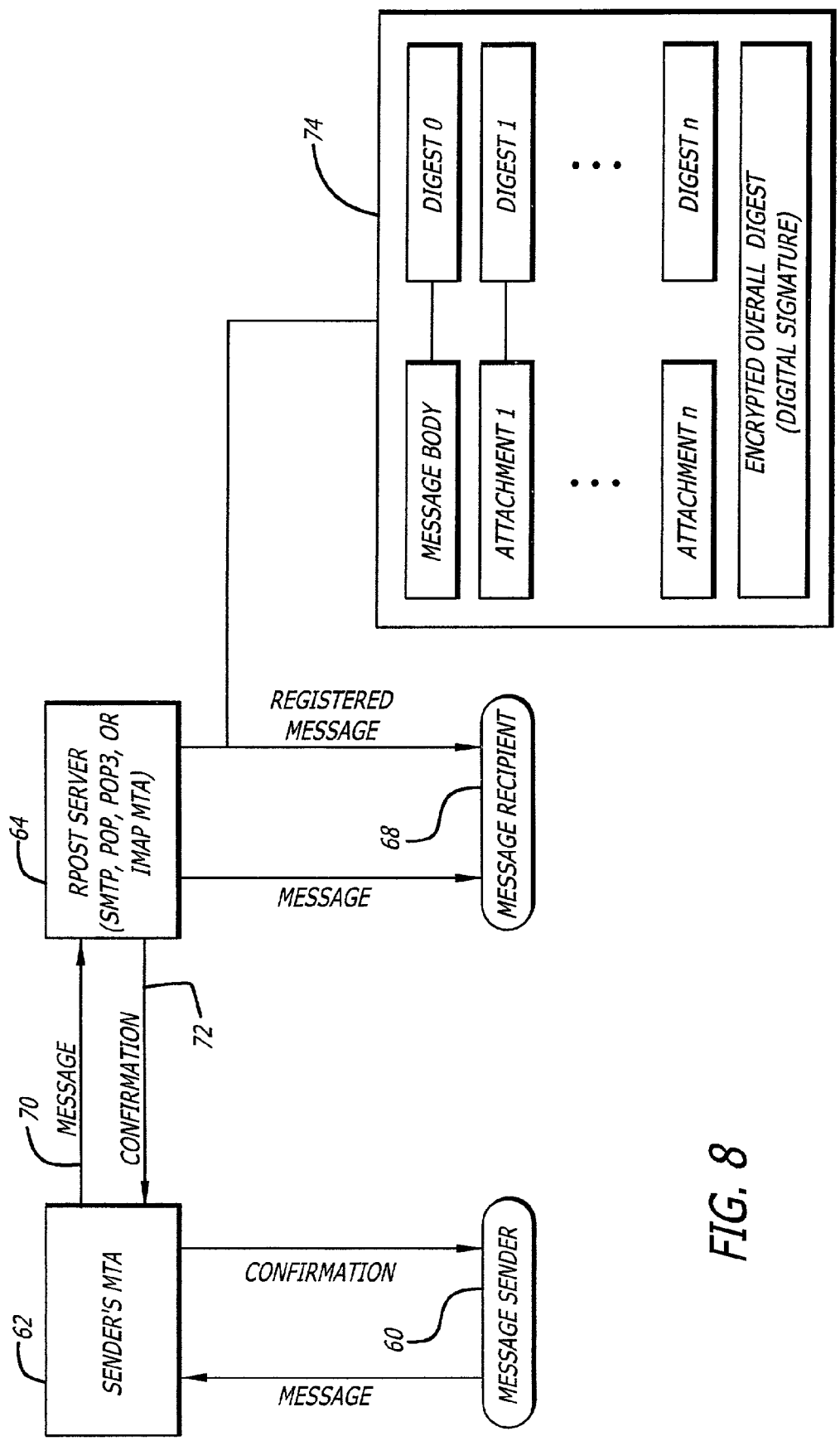
FIG. 8 is a system diagram of an embodiment disclosed and claimed in co-pending application 09/626,577 for making of record incoming messages.

FIG. 8 is a system diagram illustrating another embodiment of the invention in which incoming e-mails are made of record. In this embodiment, a message sender 60 sends an e-mail message 70. Sender's MTA 62 sends message 70 onto the internet as usual. However, in this embodiment RPost contracts with service subscriber/recipient 68 to make incoming e-mails of record. According to the agreement, RPost is designated with Network Solutions, Inc. (NSI) or other domain name authority as the mail recipient (MX server) for recipient 68. This causes the Domain Name Service (DNS) request performed by the sender's MTA 62 to return the IP address of RPost as the IP address for the recipient, which in turn causes sender's MTA 62 to send the e-mail message to RPost server 64. RPost server 64 acts as an SMTP, POP, POP3 or IMAP MTA (collectively, "POP mail server") for recipient 68. SMTP, POP and IMAP MTAs are governed by RFC 821, the SMTP protocol, RFC 1939 Post Office Protocol—Version 3 (which obsoleted RFC1725), and RFC 2060 IMAP (Internet Message Access Protocol) Version 4 rev 1 (which obsoleted RFC1730), which are hereby incorporated by reference.

RPost server 64 prepares a made-of-record version 74 of the original message 70, and places this made-of-record version 74 into recipient 68's in-box instead of, or in addition to, the original message 70. The made-of-record version may have all of the verification and informational features and options discussed earlier in connection with e-mail receipts. This information can include, but is not limited to: individual message digests for each of the message body and text, the to/from information, other header information, each attachment, an overall message digest and digital signature and message routing information and tags. Made-of-record version 74 of message 70 as shown in FIG. 6 includes the message body including the header information, an attachment, separate message digests for each, and a digital signature or encrypted message digest. The hash functions and encryption are performed using private phrases or private keys known only to the operators of the system. The made-of-record version 74 is made available to recipient 68 for inspection or downloading through the recipient's MUA.

RPost server 64 can optionally send a confirming e-mail 72 to message sender 60. Confirmation message 72 can be a simple text message indicating that a message was received and made of record. Confirmation message 72 could also include a message such as, "Your e-mail message was received on Mar. 24, 2000 at 2:05 p.m. The digital signature of the message was [128-bit digital signature]. For more information, visit our website at www.RPost.com." Alternatively, or additionally, confirmation message 72 could include all of the information contained in the made-of-record version 74.

Thus, the system may provide to message recipient 68 a receipt 74 or other verifiable confirmation that:

(1) the recipient received an e-mail message;
(2) the message was received at a certain time;
(3) the e-mail was addressed from a certain sender;
(4) the message purports to be delivered via a certain network route; and
(5) the e-mail message and its attachments had a specific content.

Accordingly, the system provides evidence, which may be attested to by the operators of the system, that particular electronic messages and documents were delivered to recipients having certain content and representing themselves as having come from certain senders.

Figure 9:
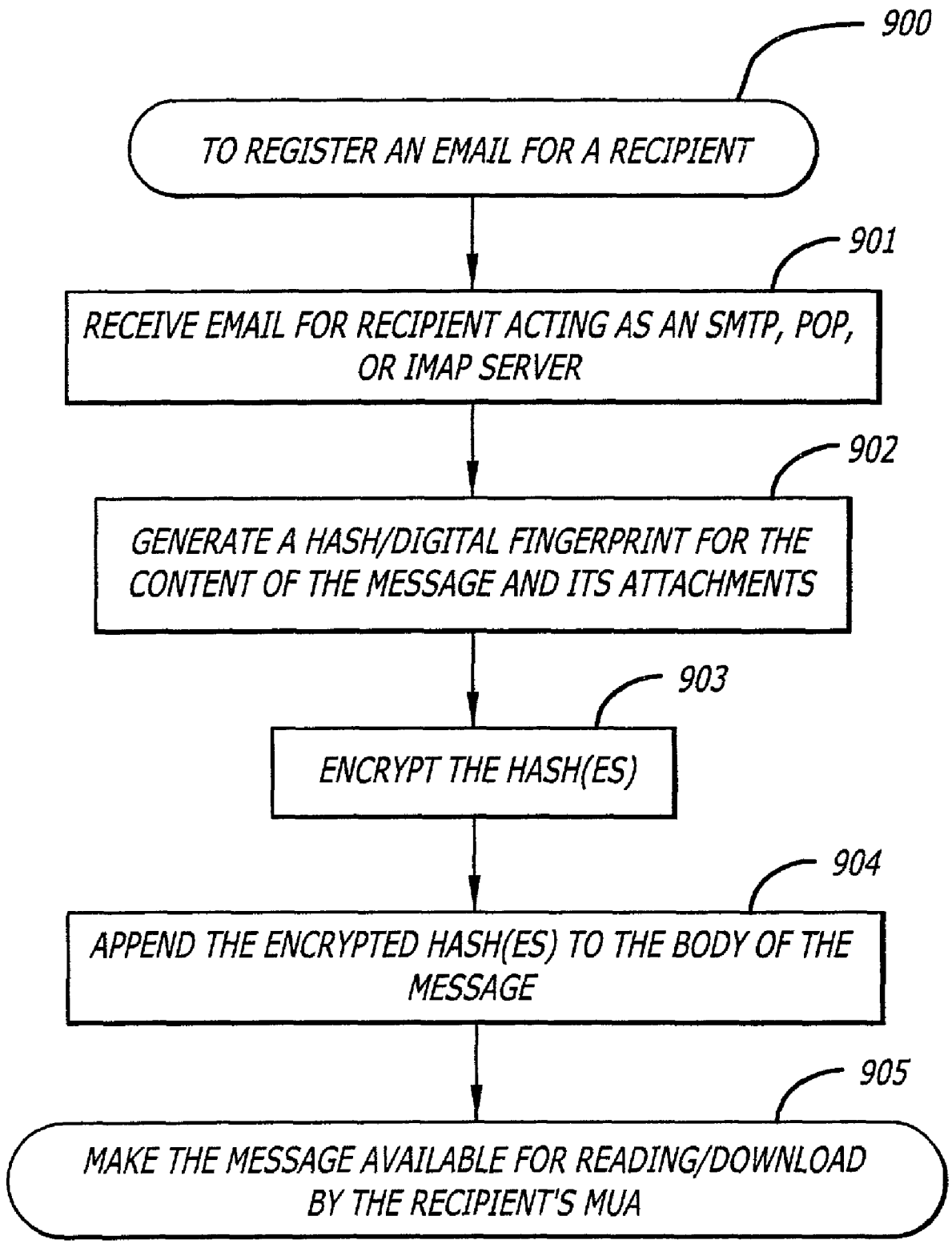
FIG. 9 is a flow diagram for making of record incoming messages.

FIG. 9 is a flow chart illustrating one example of making of record in-bound mail. In step 901, RPost server 64 receives a new e-mail message. In step 902, the system generates a hash/digital signature of the message's contents including the message's headers and attachments. Additionally, the system may generate a separate hash for each message attachment. In step 903, the system encrypts the hash(es) using an encryption key known only to the operators of the system. In step 904, the resulting encrypted hash(es) is then appended to the body of the message. Then, in step 905, the modified message may be made available for inspection or downloading through the recipient's MUA.

Figure 10:
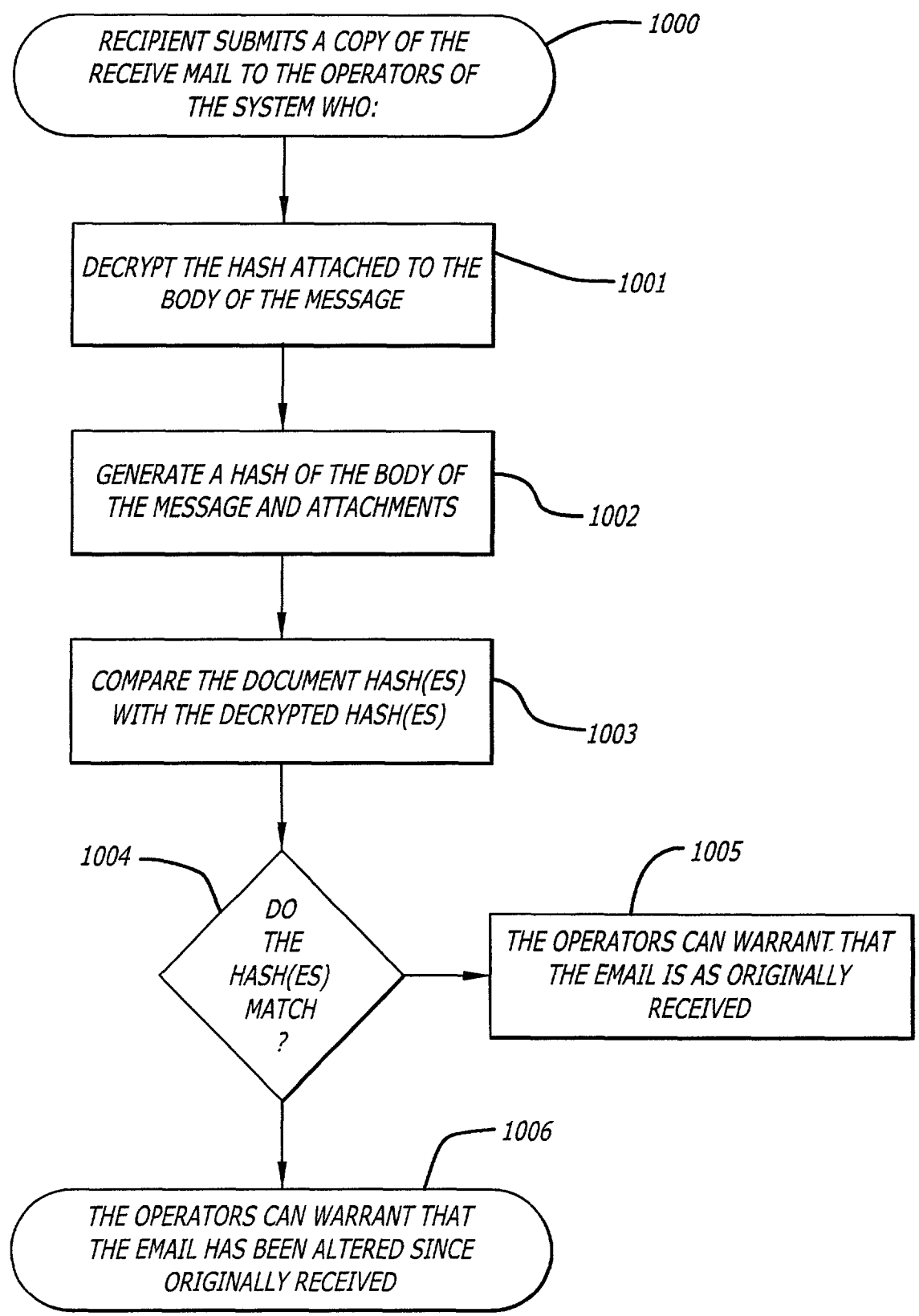
FIG. 10 is a flow diagram of a system disclosed and claimed in co-pending application 09/626,577 for validating received messages made of record.

FIG. 10 is a flow chart of one example of validating a received made-of-record e-mail message. In step 1000, in the event that the recipient of a message should require evidence that an e-mail with a specific content was received at a particular time, the recipient can present a copy of the made-of-record version 74 (FIG. 8) of e-mail message 70 to the operators of the system for verification. To verify the message, in step 1001 the system detaches and decrypts the document digital signature appended to the message. In step 1002, the system generates a hash of the balance of the document, and one for each file attached to the message. In steps 1003 and 1004, the hashes are compared. If the document hash(es) matches the decrypted hash(es), then the message and its attachments have passed through the system and have not been altered since their delivery to the recipient.

Having determined that the e-mail is unaltered, the operators of the system can warrant that:

(1) the e-mail was received by the system at a certain time;
(2) the e-mail purported to arrive at the system via a certain internet route;
(3) the e-mail purported to be from a certain sender; and
(4) the e-mail and its attachments were delivered with the specific content they currently contain.

On the other hand, in step 1006, if the hash values do not match, then the operator cannot warrant that the e-mail is authentic, i.e., that the e-mail is an accurate version of an e-mail that was received by the system.

Figure 11:
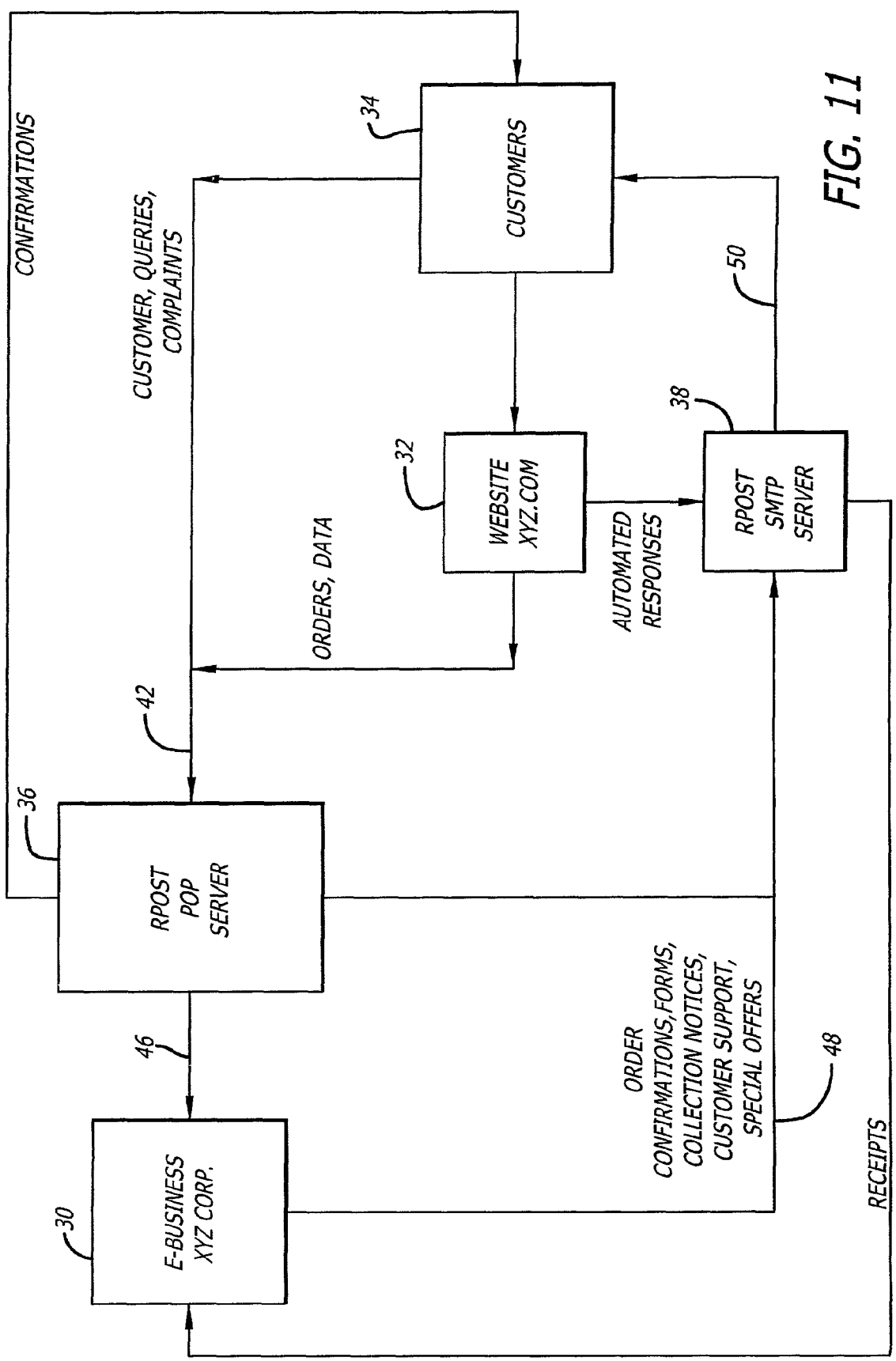
FIG. 11 is a system diagram showing as prior art an exemplary use of the invention disclosed and claimed in co-pending application 09/626,577 by an e-business to make of record and acknowledge incoming and outgoing communications.

FIG. 11 illustrates how the invention may be used by a business which utilizes electronic tools (an "e-business"). E-business 30 can utilize the system to make of record all incoming and outgoing e-mail messages from its customers 34. In this case, the system includes Post Office Protocol (POP) server 36 and Simple Mail Transfer Protocol (SMTP) server 38. For example, the e-business 30 can set up its website to e-mail forms to customers, and to forward queries and complaints 40 from customers 34. The made-of-record queries, complaints, orders, offers to purchase, and other information 46 are sent to the e-business 30 by the system. Receipts are then provided to the customers 34 via SMPT server 38. This way there is no question regarding whether or not the customer sent the communication and what it contained. Moreover, the e-business can set up a web site 32 through the RPost server so that every communication with the customers can be made of record. In other words, through the web site form data orders 42 and automated responses 44 can be made of record through the system server; furthermore, any confirmation, collections notices, customer support, and special offers 48 sent by the e-business to customers 34 can be made of record and the confirmation sent to the customer to eliminate arguments about what was ordered, when, or by whom. If desired, identical receipts can be provided to both the customers 34 and to e-business 30. Alternatively, the functions of POP server 36 and SMTP server 38 may be combined in a single system server.

POP is a protocol used to retrieve e-mail from an e-mail server. Many e-mail applications (sometimes called e-mail clients) use the POP protocol, although some can use the newer Internet Message Access Protocol (IMAP). One version of POP, called POP2, requires SMTP to send messages. A newer version, POP3, can be used with or without SMTP. SMTP is a protocol for sending e-mail messages between servers. Many e-mail systems that send e-mail over the internet use SMTP to send messages from one server to another; the messages can then be retrieved with an e-mail client using either POP or IMAP. In addition, SMTP is generally used to send messages from a mail client to a mail server. E-mail servers may use a variety of protocols to communicate with the internet. Commonly used protocols include SMTP, POP3 and IMAP4. Mail readers are at the opposite end of the server. Since mail servers receive messages via SMTP, e-mail readers send e-mail to a mail server using SMPT. Likewise, since mail servers send messages using POP3 and optionally IMAP4, mail readers receive messages from mail servers by using the POP3 or IMAP4 protocol.

Although the above generally describes a system and method of verifying that an e-mail was sent and/or received, the invention disclosed and claimed in application Ser. No. 09/626,577 may apply to any electronic message that can be transmitted through an electronic message network or through any electronic gate. Electronic messages may include text, audio, video, graphics, data, and attachments of various file types. The methods and techniques taught herein can be programmed into servers and other computers, and computer programs implementing the invention can be written onto computer readable media including but not limited to CD ROMs, RAM, hard drives, and magnetic tape. E-mail made-of-record services according to the present invention can be bundled with internet service provider (ISP) services to provide a single provider ISP solution to corporate and other institutional clients. Implementing the above-described invention is within the skill of the ordinary practitioner of the software arts.

As previously indicated, FIGS. 1-11 show, and the specification describes prior art systems of applicant (as disclosed and claimed in application 09/626,577) in which the server receives a message from a sender and transmits this message in a first path to a recipient or to a Mail Transport Agent (MTA) of the recipient. There are times when the sender may wish to have the server send the message to the recipient or to a Mail Transport Agent of the recipient or to the Mail Transport Agent for the recipient by a more traveled path or a less traveled route, or at least a different path, than the first path. To accomplish this, the sender marks a message form 1200 (FIG. 14) with a particular indication such as "(R)" in a particular position such as the "subject" line of the message. This particular position is indicated at 1202 in the message form 1200 in FIG. 14. The step of marking "(R)" in the "subject" line 1202 of the message is shown at 1206 in FIG. 12.

The message with the "(R)" in the "subject" line is transmitted by the sender to the server 14 which constitutes the sender's Mail Transport Agent. This is indicated at 1208 in FIG. 12. As indicated at 1210, the server scans the "subject" line to determine if there is an "(R)" in the line. If the answer is "No" (see 1211), the server transmits the message to the recipient or the recipient's Mail Transport Agent through the route shown in FIGS. 1-11 and indicated in FIG. 12 as "the ordinary route" and discussed above in the specification. This is indicated at 1212 in FIG. 12. If the answer is "Yes" (see 1213), the message is transmitted through a special network route as indicated at 1214 in FIG. 14.

Figure 12:
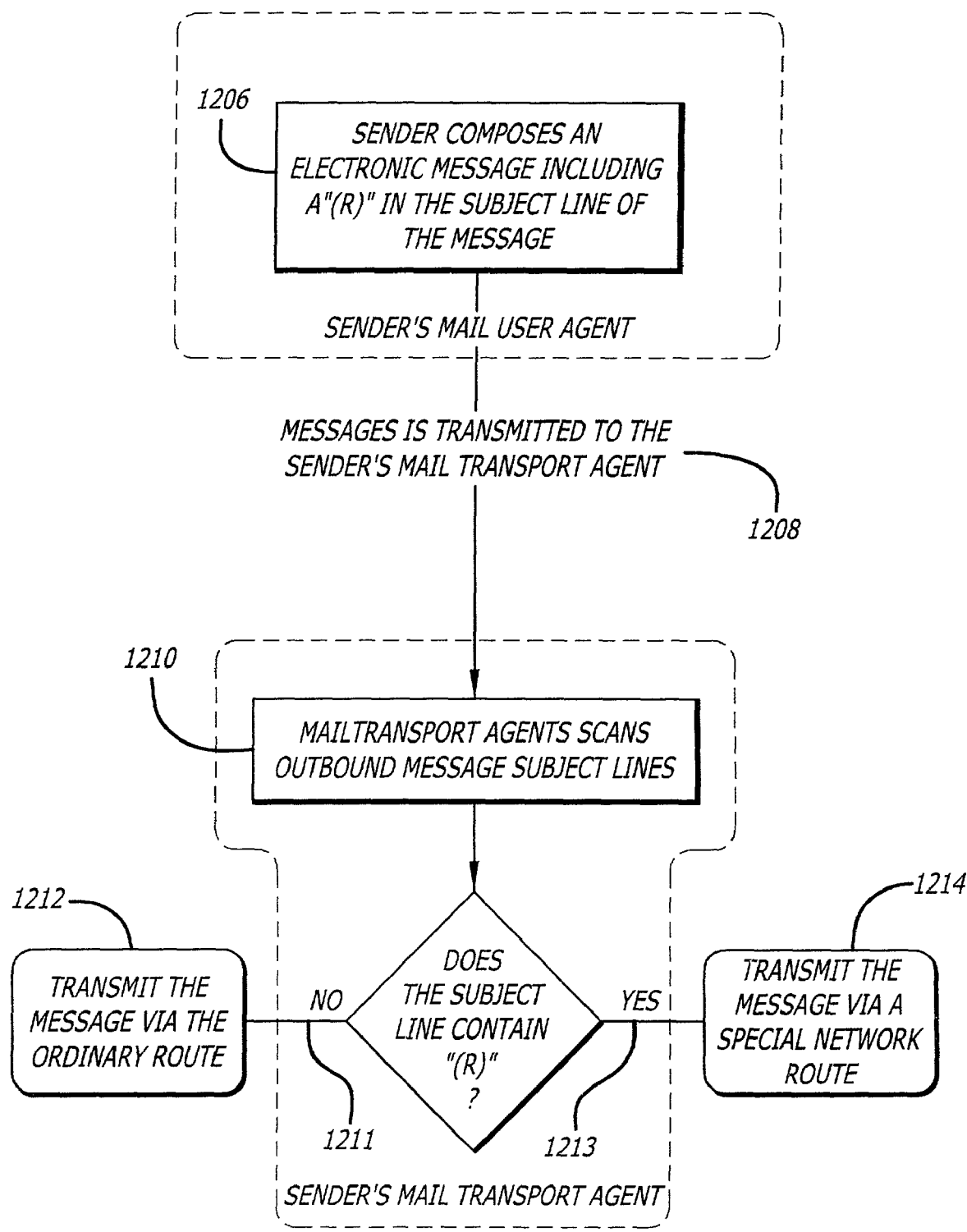
FIG. 12 is a block diagram showing a flow chart for a method of the prior art as shown in co-pending application 09/991,201, of making of record mail in a system such as shown in individual ones of the different embodiments shown in the previous Figures and showing how a message from a sender to a server with an indication representing made of record mail provides for the transmission of the message by the server to a recipient through a special route different from the route in which the message is normally transmitted by the server to the recipient.
Figure 13:
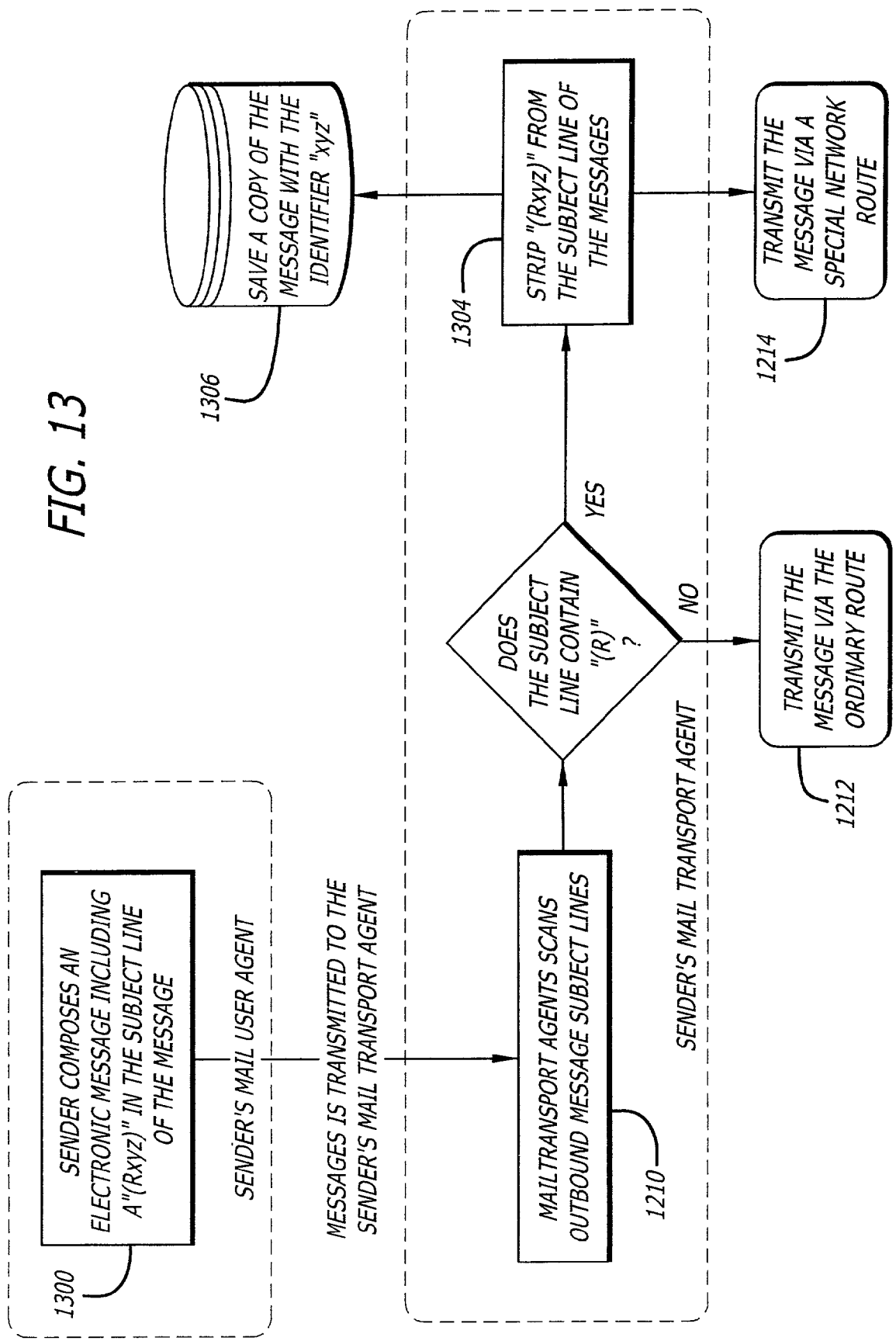
FIG. 13 is a block diagram showing in the prior art (as shown in co-pending application 09/991,201) a flow chart similar to that shown in FIG. 12 but with additional blocks for providing special functions in addition to the functions provided by the flow chart in FIG. 12.

FIG. 13 is identical in a number of respects to FIG. 12. However, FIG. 13 includes additional blocks to perform additional functions other than those shown in FIG. 12. These include, but are not limited to, the following:

(1) The sender may wish that a copy of the message should be archived. This may be accomplished by adding a coding such as the number "1" after "(R)" in the "subject" line so that the coding is "R1".

(2) The sender may desire that a record of the transmission should be recorded by the server 14 constituting the sender's mail transport agent. This may be accomplished by providing a coding such as "(R2)" in the "subject" line of the message.

(3) The sender may desire that a record of the message transmission should be recorded in a data base. This may be accomplished by providing a coding such as "(R3)" in the "subject" line of the message.

(4) The sender may wish that a record of the message transmission should be recorded in a database with a special annotation or additional reference. This may be accomplished by providing a coding such as "(R4)" in the "subject" line of the message.

FIG. 13 provides a method where the server constituting the sender's Mail Transport Agent processes selected e-mail messages such as those specified in this paragraph.

FIG. 13 is particularly limited to a coding "(xyz)" in the "subject" line of the message. In FIG. 13, the sender is shown at 1300 as composing an electronic message including "(xyz)" in the "subject" line of the message. As indicated at 1210 in FIGS. 12 and 13, the server 14 constituting the mail transport agent scans the "subject" line in the outbound message. If the "subject" line in the message does not contain the code "(R)" the server transmits the message though the route shown in FIG. 1-11 and discussed above (see 1212 in FIGS. 12 and 13). If the code "(R)" is detected by the server in the "subject" line of the message, the server transmits the message through the special network route as indicated at 1214 in FIGS. 12 and 13.

FIG. 13 indicates at 1304 that the code "(xyz)" is stripped by the server from the "subject" line of the message. If the delimiter "xyz" is detected, a copy of the message is saved. This is indicated at 1308 in FIG. 13. If the delimiter "xyz" is not identified, a copy of the message is not saved.

Figure 14:
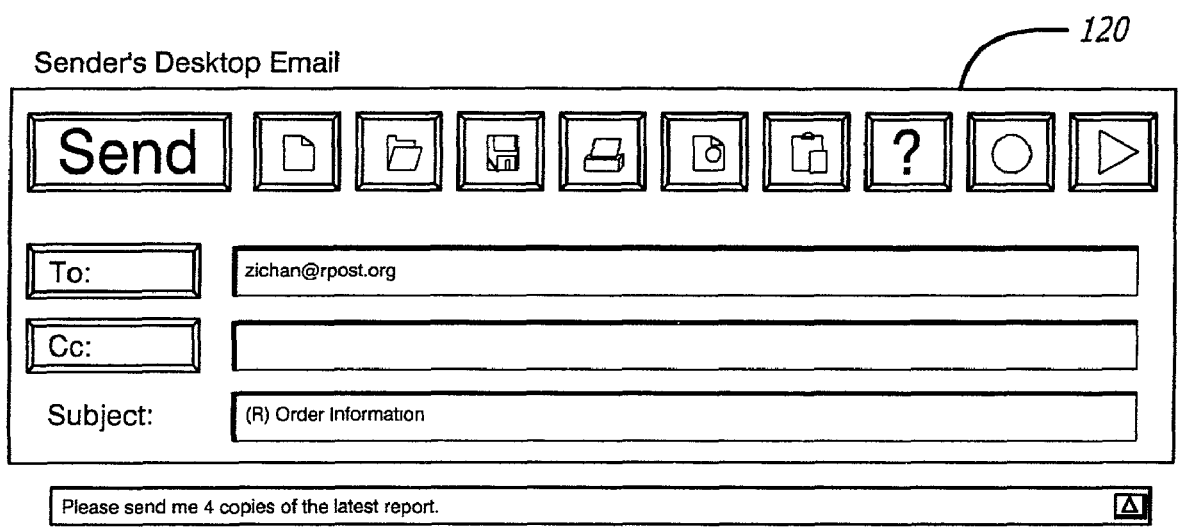
FIG. 14 is a partial view of a form which is used by the sender in the prior art (as shown in co-pending application 09/991,201) to make of record a message to be sent by the server to the recipient.

FIGS. 1-11 show a system in which a server transmits on a secure basis to a recipient messages provided by a recipient and in which the server can authenticate the message at a later time without retaining a copy of the messages. The system shown in FIGS. 1-11 in this application is also shown in FIGS. 1-11 of co-pending application 09/626,577. The portion of the specification in this application relating to FIGS. 1-11 is substantially identical to the specification in co-pending application 09/626,577. FIGS. 12-14 show a system which provides further security by registering through separate channels the message transmitted from the server to the recipient. The system shown in FIGS. 12-14 in this application are also shown in FIGS. 12-14 in co-pending application 09/991,201. The portion of the specification in this application relating to FIGS. 12-14 is substantially identical to the portion of the specification in co-pending application 09/991,201 relating to FIGS. 12-14. Although the system shown in FIGS. 1-11 and 12-14 has been invented by the applicant of this invention and is owned by the assignee of record of this application, they may be considered as prior art because they are disclosed and claimed in patent applications filed in the U.S. Patent Office by the applicant listed in this application.

The systems shown in FIGS. 1-11 and 12-14 and described above involve a sender of a message, a recipient of the message and a server which constitutes an intermediary between the sender and the recipient and which operates to provide the security in the handling of the messages. The system shown in FIG. 15 described subsequently also involves a sender, a recipient and a server designated subsequently as a "control server". However, the system shown in FIG. 15 described subsequently also involves an additional party. This additional party also receives messages from the control server but the transmission of the messages to the additional party from the control server is provided by the control server through the internet at the request of the party who would normally be considered as the recipient. The transfer of information to the additional party is at the same level of security as in the systems shown in FIGS. 1-11 and 1214.

There is another significant difference between the systems shown in FIGS. 1-11 and in 12-14 and described previously and the system shown in FIG. 15 and described subsequently. In the systems shown in FIGS. 1-11 and 12-14, the sender receives the message and the digital fingerprint or digital signature of the message. However, the party in the position of the recipient in the system shown in FIG. 15 receives the information relating to the recipient and the digital fingerprint or the digital signature of this information.

Figure 15:
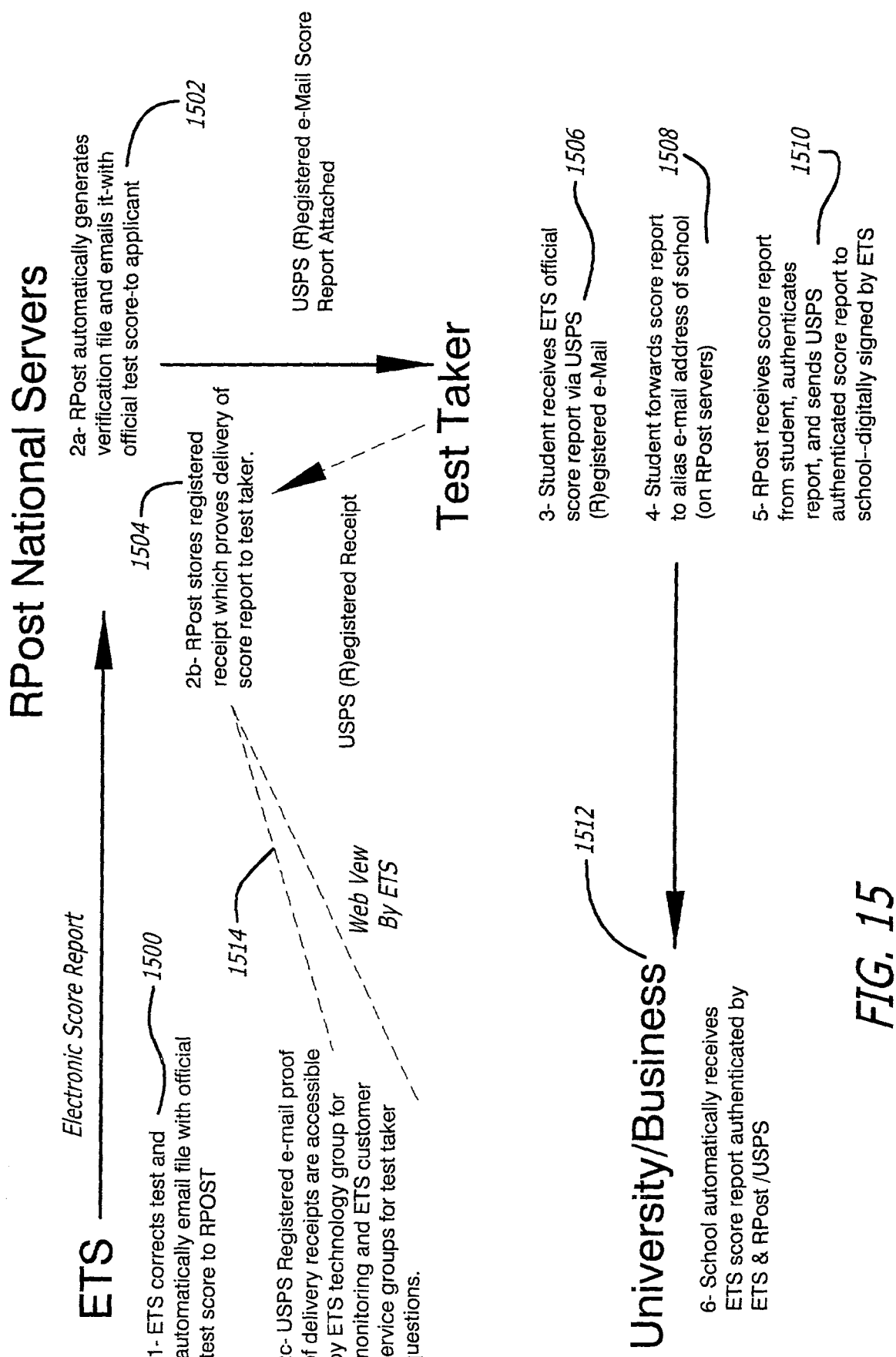
FIG. 15 is a schematic flow chart, partially in written form, showing a system constituting a preferred embodiment of the invention in which a first party provides to a control server information relating to a second party and in which the control server provides for the information to be transmitted under secure circumstances to a third party designated by the second party.

FIG. 15 illustrates a preferred embodiment of the invention discussed in the previous paragraph. As indicated at 1500 in FIG. 15, a first party provides to a second party information relating to the second party. For example, the first party may be an education testing service (ETS) providing to a second party the scores of tests taken by the second party (who may be a student) to help the student become admitted to a college or university to which the student has applied for admission. The college or university ma be considered to be a third party. The college or university may illustratively be Yale University.

As indicated at 1500, the ETS corrects the tests of the student. The test may illustratively be scholastic aptitude tests indicating the proficiency of the student in such subject matters as English and mathematics. The ETS mail, as by email, the test scores of the student to a control server, which is designated in FIG. 15 as RPOST, the assignee of record of this application. Upon receipt of the test scores, the control server generates a verification file identified by a digital fingerprint or digital signature which has been described in detail above. Alternatively, the verification may be provided by a protocol selected from a group identified previously as Simple Mail Transport Protocol (SMTP) or Extended Simple Mail Transport Protocol (ESMTP).

The RPOST control server transmits electronically such as by e-mails to the student the test scores of the student and the verification generated by the control server. This is indicated at 1502 in FIG. 15. The verification may be on the same sheet as the test scores. The RPOST control server may retain the verification but does not store the test scores. This minimizes the files that the RPOST control has to retain for the student.

The mailing of the test scores to the student through the internet may be made by registered e-mail in accordance with the disclosure in application Ser. No. 09/991,201. This further enhances the security with which the test scores are transmitted from the control server to the student. This is indicated at 1504 in FIG. 15.

As indicated at 1506 in FIG. 15, the student receives electronically such as through the internet the test scores relating to the student. The student may then wish to have the test scores sent to Yale University, one of the universities to which the student has applied for admission. The student sends (1508) to the RPOST control server electronically such as through the internet the test scores with the verification and an indication that the student wishes the test scores to be sent to Yale university.

RPOST authenticates as at 1510 the test scores 15 by comparing the verification received from the student with the verification stored in the RPOST server. Alternatively, the control server may decrypt the verification and compare the decrypted verification with the test scores transmitted by the student to the control server. When the two (2) verifications match, the RPOST control server sends to Yale University the test scores received by the control server from the student. The transmission of the test scores from the RPOST control server to Yale University may be digitally signed by ETS and may be authenticated by ETS and RPOST. The receipt by Yale of the student's test scores is indicated at 1512.

The communication line between ETS and the RPOST control server remains open (see 1514) at all times. For example, the United States Postal Service e-mail proof of delivery receipts are accessible by the ETS accessory group for monitoring. Furthermore, the files of the RPOST control server are also accessible to the ETS customer service groups to answer questions from the student or from Yale University.

It will be appreciated that the system shown in FIG. 15 and described above has many applications. As another example, the first party may be a seller of lottery tickets and the second party may be a purchaser of lottery tickets. The information relating to the purchase may be the name of the purchase of the lottery ticket, the price of the lottery ticket and the number on the lottery ticket. The third party may be an agency which dispenses funds to the holders of the winning lottery tickets.

It will be appreciated that the student may send his test grades (received from the RPOST control server) directly to the universities to which the student has applied. If any of these universities is interested in verifying the student's test scores, the university may send to the RPOST server the information that the student has received from the RPOST server and has sent to the university. The RPOST server will then authenticate these test scores in the manner described above and will indicate this authentication to the university.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents. In the following claims, those claims which contain the words "means for" are intended to be interpreted in accordance with 35 U.S.C. §112, paragraph 6; those claims which do not include the words "means for" are intended to not be interpreted in accordance with 35 U.S.C. §112, paragraph 6.

What is claimed is:

1. A method of providing to a third party information provided by a first party relating to a second party, the steps by a control server of:

receiving electronically from a first party at the control server information relating to a second party, generating a verification file including at least a portion of a mail transport protocol dialog generated during the transmission of the message from the first party to the control server, the mail transport protocol dialog including information related to the transmission of the message between the first party and the control server, and in addition includes matters relating to the identities of the first party and the control server, storing the verification file, transmitting to the second party electronically from the control server the information relating to the second party and verification file, disposing of the information related to the second party at the control server relating to the second party after the information has been transmitted by the control server to the second party, but before the information relating to the second party has been authenticated by the control server, receiving electronically at the control server from the second party the information relating to the second party and the verification file and a request by the second party to the control server to send the information to the third party, thereafter authenticating at the control server the information received by the control server from the second party, transmitting electronically from the control server to the third party the second party information received by the control server from the second party and authenticated by the control server.

2. A method as set forth in claim 1 wherein the second party information transmitted to the control server by the second party for authentication includes a digital signature of the information relating to the second party.

3. A method as set forth in claim 2 wherein the second party information is transmitted electronically by the control server on a registered basis to the second party and wherein the second party information transmitted by the control server to the third party is authenticated by the control server before the second party information is transmitted by the control server to the third party and wherein the control server does not retain the information transmitted by the first party to the control server relating to the second party after the control server transmits the information to the second party and before the information is authenticated wherein the second party information transmitted by the control server to the third party is also authenticated by the first party.

4. A method as set forth in claim 3 wherein the first party is an educational testing service and the second party is a student taking tests of the educational testing service and the information relating to the second party includes test scores of the student and the third party is a university or college to which the student has applied for admission.

5. A method as set forth in claim 1 wherein the second party information is transmitted by the control server on a registered basis to the second party and wherein the control server does not retain the information transmitted by the first party to the control server after the control server transmits the information to the second party and before the information has been authenticated.

6. A method as set forth in claim 1 wherein the second party information transmitted by the control server to the third party is authenticated by the control server before the information is transmitted by the control server to the third party.

7. A method as set forth in claim 6 wherein the second party information transmitted by the control server to the third party is also authenticated by the first party.

8. A method of providing to a third party information from a first party relating to a second party, the steps at a control server of:

receiving electronically at the control server from a first party information relating to a second party, generating a verification file including at least a portion of a mail transport protocol dialog generated during the transmission of the message from first party to the control server, the mail transport protocol dialog including information related to the transmission of the message between the first party and the control server, and in addition includes matters relating to the identities of the first party and the control server, storing the verification file, transmitting to the second party from the control server electronically the information relating to the second party and the verification file of the information and of the sending of the information, discarding at the control server the information relating to the second party, thereafter receiving electronically at the control server from the second party the information relating to the second party and the verification file of the information and a request to transmit the information to the third party, and authenticating at the control server the information received from the second party, and transmitting to the third party from the control server the information relating to the second party after the information received at the control server from the second party has been authenticated.

9. A method as set forth in claim 8 wherein the information relating to the second party is authenticated by the control server, before the information is transmitted electronically by the control server to the third party, as a result of the authentication by the control server of the verification transmitted to the control server from the second party and wherein the information received by the control server from the second party is disposed of at the control server after the information is transmitted by the control server to the second party and before the information is authenticated.

10. A method as set forth in claim 9 wherein the second party is a student taking tests for admission to college and wherein the first party is the giver of the tests and wherein the information relating to the tests includes the test scores of the student and wherein the third party is a university or college to which the student has applied for admission.

11. A method as set forth in claim 10 wherein the verification provided by the control server of the information relating to the second party includes an encrypted hash of the information.

12. A method as set forth in claim 8 wherein the second party transmits the verification electronically to the control server and wherein
the control server compares the verification transmitted to the control server by the second party and the verification received by the control server from the first party to authenticate the information transmitted electronically to the control server by the second party.

13. A method as set forth in claim 8 wherein
the verified information is encrypted at the control server before it is transmitted to the second party and wherein
the verification is decrypted after it is received by the control server from the second party and wherein
the decrypted verification is converted to information and wherein
the information converted from the decrypted verification is compared with the information transmitted to the control server from the second party to authenticate the information received by the control server from the second party.

14. A method as set forth in claim 8 wherein the verification provided by the control server of the information relating to the second party includes an encrypted hash of the information.

15. A method as set forth in claim 8 wherein
the control server receives the verification transmitted by the second party and wherein the verification provided by the control server of the information relating to the second party includes an encrypted hash of the information.

16. A method as set forth in claim 15 wherein
the information and the verification are sent electronically by the control server to the second party by registered e-mail and wherein
the control server does not retain the information relating to the second party after the control server sends the information and the verification by registered e-mail to the second party but before the control server provides any authentication of the information.

17. A method of providing to a third party information from a first party relating to a second party, the steps by a control server of:
transmitting from a first party to the control server information relating to a second party,
generating a verification including at least a portion of a mail transport protocol dialog generated during the transmission of the message from first party to the control server, the mail transport protocol dialog including information related to the transmission of the message between the first party and the control server, and in addition includes matters relating to the identities of the first party and the control server,
storing the verification,
transmitting from the control server to the second party the information relating to the second party and the verification of the information and the sending of the information,
before authentication of the information relating to the second party, transmitting from the second party to the control server the verification and the information relating to the second party and a request for the control server to submit the second party information to the third party,
before any authentication of the information relating to the second party,
discarding at the control server the information transmitted by the control server relating to the second party,
thereafter authenticating at the control server the information transmitted from the second party to the control server, and
transmitting from the control server to the third party the authenticated information relating to the second party.

18. A method as set forth in claim 17 wherein
transmittals between the control server and the second party and from the control server to the third party are provided electronically and wherein
the control server does not retain the information relating to the second party after it transmits the information and the verification to the second party.

19. A method as set forth in claim 18 wherein
the transmittal between the control server and the second party is by registered e-mail.

20. A method as set forth in claim 17, including the steps of:
comparing the verification stored at the control server and the verification transmitted from the second party to the control server to authenticate the information received by the control server from the second party.

21. A method as set forth in claim 17, including the steps at the control server of:
verifying at the control server the information relating to the second party,
encrypting the verified information at the control server,
transmitting the information and the encrypted verification from the control server to the second party,
receiving at the control server the information and the encrypted verification from the second party,
decrypting the encrypted verification from the second party,
converting the verification to information represented by the verification, and
comparing the information transmitted to the control server and the converted verification to authenticate the information in accordance with the comparison.

22. A method as set forth in claim 17 wherein
the verification at the control server is provided by an encrypted hash of the information relating to the second party.

23. A method as set forth in claim 17 wherein
the second party is a student taking educational tests and the first party is the service providing the tests and the information relating to the second party is the identity of the student and the score of the student in the tests and the third party is a college or university to which the student has applied for admission.

24. A method as set forth in claim 17 wherein
the transmittal between the control server and the second party is electronic and wherein
the transmission electronically from the control server is registered by the control server and wherein
the verification at the control server is provided by an encrypted hash of the information relating to the second party.

25. A method of providing to a third party information from a first party relating to a second party, including the steps by a control server of:
transmitting information related to a second party information from a first party to the control server,
generating a verification including at least a portion of a mail transport protocol dialog generated during the transmission of the message from first party to the control server, the mail transport protocol dialog between the first party and the control server including information related to the transmission of the message between the first party and the control server, and in addition includes matters relating to the identities of the first party and the control server, storing the verification, transmitting the second party information, and the verification of the second party information, from the control server to the second party, discarding at the control server the information relating to the second party, thereafter receiving at the control server from the second party the second party information and the verification and a request for the control server to send the second party information to the third party, authenticating at the control server the second party information previously sent by the control server to the second party and the verification transmitted by the second party to the control server, and thereafter sending the authenticated second party information from the control server to the third party.

26. A method as set forth in claim 25 wherein the first party is a test giver and the second party is a student taking the test and the third party is a college or university interested in admitting the second party as a student and the information is the identity of the student and the score attained by the student in taking the test.

27. A method as set forth in claim 25 wherein the verification is an encrypted hash and wherein the control server does not retain a copy of the second party information when it sends the second party information to the second party.

28. A method as set forth in claim 25 wherein the control server sends the second party information by registered e-mail to the third party.

29. A method of providing to a third party information provided by a first party relating to a second party, the steps by a control server of:

receiving information relating to a second party electronically at the control server from a first party, generating a verification including at least a portion of a mail transport protocol dialog generated during the transmission of the message from first party to the control server, the mail transport protocol dialog between the first party and the control server including information related to the transmission of the message from the first party to the control server, and additionally including matters relating to the identities of the first party and the control server, storing the verification, providing electronically to the second party from the control server the information relating to the second party and the verification of the information relating to the second party, thereafter disposing at the control server of the information transmitted by the control server to the second party relating to the second party, receiving electronically at the control server from the second party the information relating to the second party and the verification of the information and a request from the second party for the control server to send to the third party the information relating to the second party, and authenticating the information relating to the second party by comparing the information provided by the second party to the control server relating to the second and the verification transmitted by the second party to the control server.

\* \* \* \* \*